(12) United States Patent
Hu

(10) Patent No.: US 11,551,007 B2
(45) Date of Patent: Jan. 10, 2023

(54) DETERMINING INTENT FROM A HISTORICAL VECTOR OF A TO-BE-ANALYZED STATEMENT

(71) Applicant: Alibaba Group Holding Limited, Grand Cayman (KY)

(72) Inventor: Yuxiang Hu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 193 days.

(21) Appl. No.: 16/649,240

(22) PCT Filed: Oct. 16, 2018

(86) PCT No.: PCT/CN2018/110395
§ 371 (c)(1),
(2) Date: Mar. 20, 2020

(87) PCT Pub. No.: WO2019/076286
PCT Pub. Date: Apr. 25, 2019

(65) Prior Publication Data
US 2020/0250378 A1 Aug. 6, 2020

(30) Foreign Application Priority Data
Oct. 20, 2017 (CN) .......................... 201710987004.7

(51) Int. Cl.
*G06F 40/279* (2020.01)
*G06F 40/30* (2020.01)
(Continued)

(52) U.S. Cl.
CPC .............. *G06F 40/30* (2020.01); *G06F 40/20* (2020.01); *G06F 40/284* (2020.01); *G06F 40/295* (2020.01)

(58) Field of Classification Search
CPC ........ G06F 40/20; G06F 40/279; G06F 40/30; G06F 40/35; G10L 15/16; G10L 15/18; G10L 15/1815; G10L 15/1822
(Continued)

(56) References Cited

U.S. PATENT DOCUMENTS 7,720,835 B2 5/2010 Ward et al.
7,974,983 B2 7/2011 Goeldi
(Continued)

FOREIGN PATENT DOCUMENTS

CN 104951428 A 9/2015
CN 106095950 A 11/2016
(Continued)

OTHER PUBLICATIONS

International Search Report to corresponding International Application No. PCT/CN2018/110395 dated Jan. 16, 2019 (2 pages).

*Primary Examiner* — Martin Lerner
(74) *Attorney, Agent, or Firm* — James J. DeCarlo; Greenberg Traurig, LLP

(57) ABSTRACT

The disclosure relates to identifying a user intent of a statement. When a user intent of a to-be-analyzed statement needs to be determined, at least one historical statement of the to-be-analyzed statement can be determined from an human-computer interaction session. A historical vector determined with reference to a statement vector of the to-be-analyzed statement and a statement vector of the at least one historical statement may comprise related content in the historical statement, and the content may be associated with the content of the to-be-analyzed statement. If the user intent of the to-be-analyzed statement is determined with reference to the historical vector, then the content related to the to-be-analyzed statement comprised in the historical vector may be used as an additional determination reference,
(Continued)

so that the accuracy of determining the user intent of the to-be-analyzed statement can be improved.

20 Claims, 11 Drawing Sheets

(51) Int. Cl.
*G06F 40/35* (2020.01)
*G06F 40/284* (2020.01)
*G06F 40/295* (2020.01)
*G06F 40/20* (2020.01)

(58) Field of Classification Search
USPC .................. 704/9, 232, 236, 257; 706/55
See application file for complete search history.

(56) References Cited

U.S. PATENT DOCUMENTS

| | | | |
|---|---|---|---|
| 8,166,032 B2 | 4/2012 | Sommer et al. | |
| 8,185,486 B2 | 5/2012 | Eder | |
| 8,515,739 B2 | 8/2013 | Godbole et al. | |
| 8,856,235 B2 | 10/2014 | Zhou et al. | |
| 8,887,286 B2 | 11/2014 | Dupont et al. | |
| 8,909,771 B2 | 12/2014 | Heath | |
| 8,954,440 B1* | 2/2015 | Gattani | G06F 16/93 707/738 |
| 8,966,074 B1 | 2/2015 | Richards et al. | |
| 9,043,196 B1 | 5/2015 | Leydon et al. | |
| 9,269,068 B2 | 2/2016 | Ward et al. | |
| 9,377,933 B2 | 6/2016 | DiPersia et al. | |
| 9,471,883 B2 | 10/2016 | Chatterjee et al. | |
| 9,536,269 B2 | 1/2017 | Chang et al. | |
| 9,633,399 B2 | 4/2017 | George et al. | |
| 9,875,494 B2* | 1/2018 | Kains | G10L 15/22 |
| 10,032,463 B1* | 7/2018 | Rastrow | G10L 15/16 |
| 10,902,341 B1* | 1/2021 | Qureshi | G06N 20/00 |
| 2010/0058237 A1* | 3/2010 | Nishizaki | G06F 9/453 715/812 |
| 2013/0268468 A1* | 10/2013 | Vijayaraghavan | G06N 20/00 706/12 |
| 2014/0207622 A1* | 7/2014 | Vijayaraghavan | G06F 16/951 705/26.62 |
| 2015/0149177 A1* | 5/2015 | Kains | G10L 15/1822 704/257 |
| 2016/0196258 A1* | 7/2016 | Ma | G06F 40/30 704/8 |
| 2016/0203411 A1 | 7/2016 | Sadikov et al. | |
| 2016/0314092 A1* | 10/2016 | Suzuki | G06F 1/3287 |
| 2017/0372199 A1* | 12/2017 | Hakkani-Tur | G10L 15/22 |
| 2017/0372200 A1* | 12/2017 | Chen | G10L 15/1822 |
| 2018/0040020 A1* | 2/2018 | Ku | G06Q 30/0277 |
| 2018/0060301 A1* | 3/2018 | Li | G06F 40/289 |
| 2018/0157638 A1* | 6/2018 | Li | G10L 25/30 |
| 2019/0034795 A1* | 1/2019 | Zitouni | G06F 40/30 |
| 2019/0188257 A1* | 6/2019 | Iida | G06F 40/279 |

FOREIGN PATENT DOCUMENTS

| | | |
|---|---|---|
| CN | 106407333 A | 2/2017 |
| CN | 106897263 A | 6/2017 |

* cited by examiner

# DETERMINING INTENT FROM A HISTORICAL VECTOR OF A TO-BE-ANALYZED STATEMENT

CROSS-REFERENCE TO RELATED APPLICATIONS

The present application claims priority to and is the national stage entry of Int'l Appl. No. PCT/CN2018/110395, filed Oct. 16, 2018, which claims priority to Chinese Patent Application No. 201710987004.7, filed Oct. 20, 2017, both of which are incorporated herein by reference in their entirety.

BACKGROUND

Technical Field

The disclosure relates to the field of data processing, and in particular, to methods and apparatuses for identifying a user intent of a statement.

Description of the Related Art

With the development of artificial intelligence technologies, machines can identify the meanings of statements by analyzing human languages, thus performing language interaction with users.

A question-and-answer scenario is a typical interaction scenario, and a machine can provide targeted replies to user questions. Before replying, the machine needs to be able to identify a user intent of a question and the specific meaning of the question so that the machine can accurately provide a reply to the question.

In current systems, the machine mainly uses text included in the question of a user as a reference for identifying a user intent of the question. However, in some cases, the identified user intent is inaccurate and thus, the provided answer may be inconsistent with the user intent which provides a negative user experience.

SUMMARY

To solve the above-mentioned technical problem, a method for identifying a user intent of a statement that solves the problem of low accuracy of the conventional identification method and improves the user experience is provided in the disclosure. The following technical solutions are discussed in more detail in the description of the embodiments.

In one embodiment, a method for identifying a user intent of a statement is disclosed in the embodiments of the disclosure, and applied in a human-computer interaction (HCI) session, the HCI session comprising a plurality of statements. The method comprises: acquiring a to-be-analyzed statement and at least one historical statement corresponding to the to-be-analyzed statement from the plurality of statements, wherein the at least one historical statement is a statement appearing before the to-be-analyzed statement in the HCI session; determining a historical vector of the to-be-analyzed statement according to a statement vector of the to-be-analyzed statement and a statement vector of the at least one historical statement, wherein the historical vector comprises information related to the to-be-analyzed statement in the at least one historical statement; and determining a user intent of the to-be-analyzed statement according to the historical vector.

In one embodiment, a plurality of to-be-analyzed statements exist, and the plurality of to-be-analyzed statements are the last plurality of statements in an interaction order among the plurality of statements.

In one embodiment, a statement interval between the at least one historical statement and the to-be-analyzed statement is less than a preset threshold.

In one embodiment, when the at least one historical statement comprises a plurality of historical statements, the plurality of historical statements comprise a first historical statement and a second historical statement, and the determining a historical vector of the to-be-analyzed statement according to a statement vector of the to-be-analyzed statement and a statement vector of the at least one historical statement comprises: determining a semantic similarity of the first historical statement for the to-be-analyzed statement and a semantic similarity of the second historical statement for the to-be-analyzed statement according to the statement vector of the to-be-analyzed statement, a statement vector of the first historical statement, and a statement vector of the second historical statement; determining an appearance positional relationship between the first historical statement and the to-be-analyzed statement as well as an appearance positional relationship between the second historical statement and the to-be-analyzed statement in the HCI session; and determining the historical vector of the to-be-analyzed statement according to the semantic similarity of the first historical statement, the semantic similarity of the second historical statement, the appearance positional relationship of the first historical statement, and the appearance positional relationship of the second historical statement.

In one embodiment, the determining a user intent of the to-be-analyzed statement according to the historical vector comprises: determining a fused vector of the to-be-analyzed statement according to the historical vector and the statement vector of the to-be-analyzed statement; and determining the user intent of the to-be-analyzed statement according to the fused vector.

In one embodiment, determining a fused vector of the to-be-analyzed statement according to the historical vector and the statement vector of the to-be-analyzed statement comprises weighted-summing the historical vector and the statement vector of the to-be-analyzed statement to obtain the fused vector of the to-be-analyzed statement.

In one embodiment, the determining the user intent of the to-be-analyzed statement according to the fused vector comprises: mapping the fused vector to a plurality of preset user intents and determining the user intent of the to-be-analyzed statement from the plurality of user intents according to mapping results on the plurality of user intents.

In one embodiment, the to-be-analyzed statement comprises at least one word segment, and after determining the historical vector of the to-be-analyzed statement according to the statement vector of the to-be-analyzed statement and the statement vectors of the plurality of historical statements, the method further comprises: determining a word vector of a first word segment, wherein the first word segment is one of the at least one word segment; determining a fused word vector of the first word segment according to the historical vector and the word vector of the first word segment; and determining an entity type of the first word segment according to the fused word vector of the first word segment.

In one embodiment, when the to-be-analyzed statement comprises a plurality of word segments, the determining an entity type of the first word segment according to the fused word vector of the first word segment comprises: determining the entity type of the first word segment according to the fused word vector of the first word segment, a fused word vector of a second word segment, and a pre-learned entity type dependency relationship, wherein the second word segment is one of the plurality of word segments.

In another embodiment, an apparatus for identifying a user intent of a statement is disclosed in the embodiments of the disclosure, and applied in an HCI session, the HCI session comprising a plurality of statements. The apparatus comprises an acquisition unit, a first determining unit, and a second determining unit, wherein the acquisition unit acquires a to-be-analyzed statement, and at least one historical statement corresponding to the to-be-analyzed statement from the plurality of statements, wherein the at least one historical statement is a statement appearing prior to the to-be-analyzed statement in the HCI session; the first determining unit determining a historical vector of the to-be-analyzed statement according to a statement vector of the to-be-analyzed statement and a statement vector of the at least one historical statement, wherein the historical vector comprises information related to the to-be-analyzed statement in the at least one historical statement; and the second determining unit determines a user intent of the to-be-analyzed statement according to the historical vector.

In one embodiment, a plurality of to-be-analyzed statements exist, and the plurality of to-be-analyzed statements are the last plurality of statements in an interaction order among the plurality of statements.

In one embodiment, a statement interval between the at least one historical statement and the to-be-analyzed statement is less than a preset threshold.

In one embodiment, the first determining unit comprises a semantic similarity determining subunit, a positional relationship determining subunit, and a historical vector determining subunit, wherein the semantic similarity determining subunit, when the at least one historical statement comprises a plurality of historical statements and the plurality of historical statements comprise a first historical statement and a second historical statement, determines a semantic similarity of the first historical statement for the to-be-analyzed statement and a semantic similarity of the second historical statement for the to-be-analyzed statement according to the statement vector of the to-be-analyzed statement, a statement vector of the first historical statement, and a statement vector of the second historical statement; the positional relationship determining subunit determining an appearance positional relationship between the first historical statement and the to-be-analyzed statement as well as an appearance positional relationship between the second historical statement and the to-be-analyzed statement in the HCI session; and the historical vector determining subunit determining the historical vector of the to-be-analyzed statement according to the semantic similarity of the first historical statement, the semantic similarity of the second historical statement, the appearance positional relationship of the first historical statement, and the appearance positional relationship of the second historical statement.

In one embodiment, the second determining unit comprises a fused vector determining subunit and a user intent determining subunit, wherein the fused vector determining subunit determines a fused vector of the to-be-analyzed statement according to the historical vector and the statement vector of the to-be-analyzed statement; and the user intent determining subunit determines the user intent of the to-be-analyzed statement according to the fused vector.

In one embodiment, the fused vector determining subunit weighted-sums the historical vector and the statement vector of the to-be-analyzed statement to obtain the fused vector of the to-be-analyzed statement.

In one embodiment, the user intent determining subunit comprises a mapping subunit and a determining subunit, wherein the mapping subunit maps the fused vector to a plurality of preset user intents; and the determining subunit determines the user intent of the to-be-analyzed statement from the plurality of user intents according to mapping results on the plurality of user intents.

In one embodiment, the apparatus further comprises a third determining unit, a fourth determining unit, and a fifth determining unit, wherein the third determining unit determines a word vector of a first word segment, wherein the first word segment is one of the at least one word segment; the fourth determining unit determines a fused word vector of the first word segment according to the historical vector and the word vector of the first word segment; and the fifth determining unit determines an entity type of the first word segment according to the fused word vector of the first word segment.

In one embodiment, the fifth determining unit, when the to-be-analyzed statement comprises a plurality of word segments, determines the entity type of the first word segment according to the fused word vector of the first word segment, a fused word vector of a second word segment, and a pre-learned entity type dependency relationship, wherein the second word segment is one of the plurality of word segments.

In another embodiment, a device for identifying a user intent of a statement is disclosed in the embodiments of the disclosure, and applied in an HCI session, the HCI session comprising a plurality of statements. The device comprises a processor and a memory, wherein the memory stores program code and transmit transmits the program code to the processor; and the processor performs the following method according to instructions in the program code: acquiring a to-be-analyzed statement and at least one historical statement corresponding to the to-be-analyzed statement from the plurality of statements, wherein the at least one historical statement is a statement appearing prior to the to-be-analyzed statement in the HCI session; determining a historical vector of the to-be-analyzed statement according to a statement vector of the to-be-analyzed statement and a statement vector of the at least one historical statement, wherein the historical vector comprises information related to the to-be-analyzed statement in the at least one historical statement; and determining a user intent of the to-be-analyzed statement according to the historical vector.

In one embodiment, a plurality of to-be-analyzed statements exist, and the plurality of to-be-analyzed statements are the last plurality of statements in an interaction order among the plurality of statements.

In one embodiment, a statement interval between the at least one historical statement and the to-be-analyzed statement is less than a preset threshold.

In one embodiment, the processor performs the following method according to the instructions in the program code: determining a semantic similarity of the first historical statement for the to-be-analyzed statement and a semantic similarity of the second historical statement for the to-be-analyzed statement according to the statement vector of the to-be-analyzed statement, a statement vector of the first historical statement, and a statement vector of the second historical statement; determining an appearance positional relationship between the first historical statement and the to-be-analyzed statement as well as an appearance positional relationship between the second historical statement and the to-be-analyzed statement in the HCI session; determining the historical vector of the to-be-analyzed statement according to the semantic similarity of the first historical statement, the semantic similarity of the second historical statement, the appearance positional relationship of the first historical statement, and the appearance positional relationship of the second historical statement.

In one embodiment, the processor performs the following method according to the instructions in the program code: determining a fused vector of the to-be-analyzed statement according to the historical vector and the statement vector of the to-be-analyzed statement; and determining the user intent of the to-be-analyzed statement according to the fused vector.

In one embodiment, the processor performs the following method according to the instructions in the program code: weighted-summing the historical vector and the statement vector of the to-be-analyzed statement to obtain the fused vector of the to-be-analyzed statement.

In one embodiment, the processor performs the following method according to the instructions in the program code: mapping the fused vector to a plurality of preset user intents; and determining the user intent of the to-be-analyzed statement from the plurality of user intents according to mapping results on the plurality of user intents.

In one embodiment, the processor further performs the following method according to the instructions in the program code: determining a word vector of a first word segment, wherein the first word segment is one of the at least one word segment; determining a fused word vector of the first word segment according to the historical vector and the word vector of the first word segment; and determining an entity type of the first word segment according to the fused word vector of the first word segment.

In one embodiment, the processor further performs the following method according to the instructions in the program code: determining the entity type of the first word segment according to the fused word vector of the first word segment, a fused word vector of a second word segment, and a pre-learned entity type dependency relationship, wherein the second word segment is one of the plurality of word segments.

In another embodiment, a storage medium is disclosed in the embodiments of the disclosure, the storage medium stores program code, and the program code is used for performing the method for identifying a user intent of a statement provided in the aforementioned embodiments of the disclosure.

In another embodiment, a computer program product comprising instructions is disclosed in the embodiments of the disclosure, wherein when the computer program product is run on a computer, the computer is caused to perform the method for identifying a user intent of a statement provided in the aforementioned embodiments of the disclosure.

As summarized above and described in more detail herein, when a user intent of a to-be-analyzed statement needs to be determined, at least one historical statement of the to-be-analyzed statement can be determined from an HCI session where the to-be-analyzed statement is located; HCI generally has certain continuity, and therefore, content of the historical statement in the HCI session may be related to content of the to-be-analyzed statement. A historical vector determined with reference to a statement vector of the to-be-analyzed statement and a statement vector of the at least one historical statement may comprise related content in the historical statement, and the content may be associated with the content of the to-be-analyzed statement to a certain extent. If the user intent of the to-be-analyzed statement is determined with reference to the historical vector, then the content related to the to-be-analyzed statement comprised in the historical vector may be used as an additional determination reference, and more determination references can improve the accuracy of determining the user intent of the to-be-analyzed statement.

BRIEF DESCRIPTION OF THE DRAWINGS

To describe the technical solutions in the embodiments of the disclosure, the accompanying drawings used in the description of the embodiments are briefly introduced below. The accompanying drawings in the following description are merely some embodiments of the disclosure. Those of ordinary skill in the art can further obtain other accompanying drawings based on these accompanying drawings without significant efforts.

DETAILED DESCRIPTION

Figure 1:
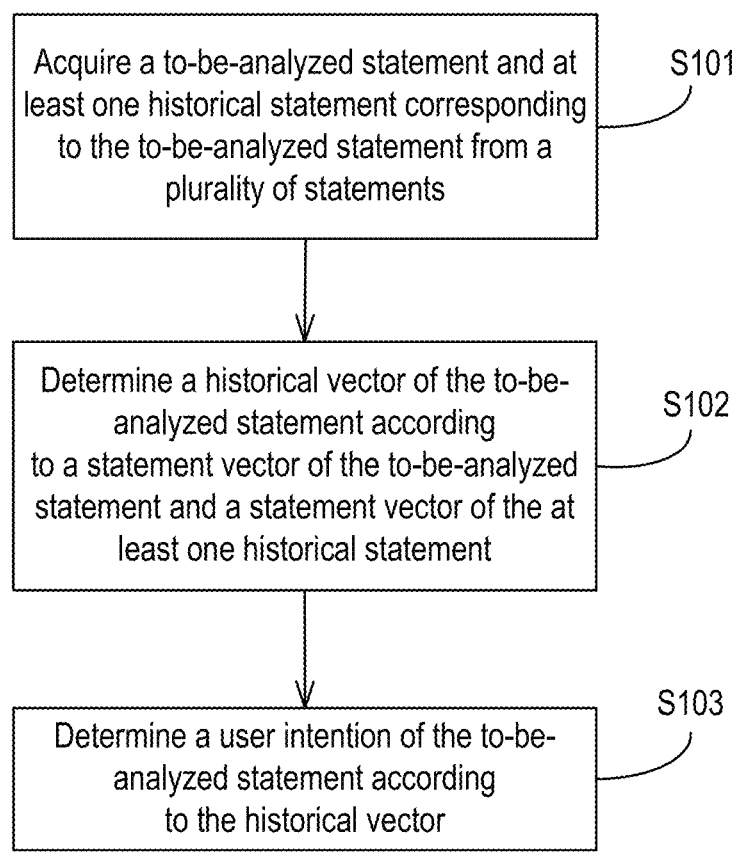
FIG. 1 is a flow diagram illustrating a method for identifying a user intent of a statement according to some disclosed embodiments.

The disclosed embodiments are described below with reference to the accompanying drawings.

Currently, the development of artificial intelligence technologies is in full swing and such technologies have been increasingly applied in daily life. For example, a user can talk with the Siri® digital assistant provided on iPhone devices provided by Apple Inc. of Cupertino, Calif., a chatting robot (Xiaobing) provided by Microsoft Inc. of Redmond, Wash., and others, to search for weather, ask for directions, play music, pose general questions, and the like. In addition to applications in daily life, the application of artificial intelligence technologies in the workplace is also a major development trend. The use of robots in place of conventional labor (e.g., the use of robots in the field of logistics for package sorting) can effectively reduce labor costs and facilitate enterprise management. Like the steam engine in the industrial age and the computer in the information age, artificial intelligence will bring profound changes to society and bring new changes to human life.

At the core of artificial intelligence is human-computer interaction (HCI) technology. The most important point that distinguishes humans from machines is that humans can think independently, and machines are mechanical. Therefore, the purpose of artificial intelligence is to enable machines to think like humans. Based on the premise that a machine can think, and the machine can understand human intent and respond to the human intent, the interaction between the human and the machine (i.e., HCI) is thus performed. Therefore, the development of HCI depends on the improvement of the accuracy of identifying user intent.

Conventional user intent identification is performed by analyzing a current statement of a user with reference to a fixed statement pattern. Due to the flexibility and variability of human language, the user intent obtained by using this technique is often inconsistent with the actual intent of the user. For example, consider the following scenario (where "Q" represents a question of a user, "A" represents an answer of a machine, numerals represent the sequence of questions and answers, and "xxx" represents an answer to a question, the contents of which are not critical to the discussion of the dialog):

Q1: What's the weather like in Ürümqi tomorrow?
A1: xxx
Q2: What about the day after tomorrow?
A2: xxx
Q3: What about Shanghai?
A3: xxx In this round of dialog, the machine needs to identify the intent of each question (Q1, Q2, Q3, etc.; referred to collectively as Q); that is, what the user intends to express through the content in Q, and what the purpose is. Obviously, for the intents of Q2 and Q3, it is difficult to acquire accurate results according to the conventional method, and the intents can only be judged accurately with reference to historical information (e.g., previous questions such as Q1). An illustration is made by taking Q3 as an example. In the conventional method, if the intent of a to-be-analyzed statement "What about Shanghai" is to be identified, then analysis can be made generally according to the content of the to-be-analyzed statement. However, the to-be-analyzed statement is not enough to accurately determine the intent of the to-be-analyzed statement. The obtained intent may be what's the weather like in Shanghai or what scenic spots are there in Shanghai, among many others, which obviously differs from the actual intent of the to-be-analyzed statement, namely, "What's the weather like in Shanghai the day after tomorrow?". If the machine replies according to the intent determined by using the conventional method, then the content of the reply is obviously inconsistent with the content that the user intends to know, resulting in poor user experience and inaccurate results.

Therefore, methods and apparatuses for identifying a user intent of a statement are provided in the embodiments of the disclosure. When a user intent of a to-be-analyzed statement needs to be determined, at least one historical statement of the to-be-analyzed statement can be determined from an HCI session where the to-be-analyzed statement is located; HCI generally has certain continuity, and therefore, content of the historical statement in the HCI session may be related to content of the to-be-analyzed statement. A historical vector determined with reference to a statement vector of the to-be-analyzed statement and a statement vector of at least one historical statement may include related content in the historical statement, and the content may be associated with the content of the to-be-analyzed statement to a certain extent. If the user intent of the to-be-analyzed statement is determined with reference to the historical vector, then the content related to the to-be-analyzed statement included in the historical vector may be used as an additional determination reference, and more determination references can improve the accuracy of determining the user intent of the to-be-analyzed statement.

The disclosed embodiments are mainly applied in a Recurrent Neural Network (RNN), and a statement vector of a statement can be determined through the RNN. The statement mentioned in the embodiments of the disclosure may include one or a plurality of characters, and according to different language forms or languages, a plurality of different character forms and character combinations may exist. A statement vector of a statement is a vector carrying information of all words in the statement and obtained in a vectorized form. For example, it is assumed that a statement that has been word segmented is input, and the statement has n word segments; after passing through the RNN, n output vectors $r_1 \ldots r_{n-1}, r_n$ respectively corresponding to the n word segments exist, and the output vectors can be used as word vectors of the word segments. Due to the memorability of the RNN, the output vector $r_i$ of the $i^{th}$ word segment contains information of all word segments, namely, $r_1, \ldots r_{i-1}$ prior to the word segment, and thus the output vector of the last word segment should contain the information of all the word segments in the statement. Therefore, the output vector $r_n$ of the last word segment can be used as the statement vector of the statement.

When a user intent of a statement, namely, the to-be-analyzed statement, is determined, in the disclosed embodiments, the user intent of the to-be-analyzed statement is determined with reference to the statement vector of at least one historical statement. The historical statement here is determined relative to the to-be-analyzed statement of which the user intent is to be analyzed. The to-be-analyzed statement is a statement of which the user intent needs to be determined by the machine. In general, the to-be-analyzed statement is the last statement inputted by the user in the HCI session and is a statement that needs to be replied and responded to by the machine. When the machine reply is slow, the to-be-analyzed statement may also be a statement that is not replied by the machine among the user input statements. One to-be-analyzed statement or a plurality of to-be-analyzed statements may exist. When a plurality of to-be-analyzed statements exists, the plurality of to-be-analyzed statements may be the last plurality of statements in an interaction order among a plurality of statements. It should be noted that the machine appearing in the embodiments of the disclosure is not limited to a machine in the conventional sense, but may also be software capable of implementing interactive functions, or a terminal, a server, or the like where the software is deployed.

The to-be-analyzed statement and the historical statement corresponding to the to-be-analyzed statement both appear in the same HCI session. In this HCI session, the HCI is a continuous process. The historical statement is a statement appearing prior to the to-be-analyzed statement in the HCI session, and both the historical statement and the to-be-analyzed statement are statements inputted by the user. For example, in the above-mentioned example of Q1→A1, Q2→A2, and Q3→A3, if the machine needs to analyze a user intent of Q2, then Q1 can be used as a historical statement of Q2. If the machine needs to analyze a user intent of Q3, then Q1 and Q2 can be used as historical statements of Q3.

Embodiment 1

A method for identifying a user intent of a statement according to some embodiments of the disclosure is described in detail below with reference to the accompanying drawings. FIG. 1 is a flow diagram illustrating a method for identifying a user intent of a statement according to an embodiment of the disclosure. The method includes the following steps.

S101: acquire a to-be-analyzed statement and at least one historical statement corresponding to the to-be-analyzed statement from a plurality of statements, where the at least one historical statement is a statement appearing prior to the to-be-analyzed statement in an HCI session.

In the illustrated embodiment, the statements above are located in the same HCI session and are all input by a user. The method for inputting is not limited. For example, the statements may be manually inputted by the user through an input device such as a keyboard or may be recognized by a machine from a voice input by the user. For example, in a digital voice assistant Siri®, the meaning of the voice needs to be parsed first to convert the voice into text, thereby identifying user intent. Since voice parsing is not a technical problem to be solved by the disclosure, the technical solution of identifying a user intent in the disclosure is illustrated by taking the statement in the form of text as an example in the embodiments of the disclosure.

In the above-mentioned application scenario of a weather query, if a to-be-analyzed statement is determined in a conventional manner, then a user intent of the to-be-analyzed statement may generally be determined with reference to a syntactic structure, semantic meaning, or the like of the to-be-analyzed statement itself. If the to-be-analyzed statement is Q3 ("What about Shanghai"), then the machine can analyze the user intent of Q3 according to the syntactic structure and semantic meaning of Q3 itself. The content contained in Q3 makes it difficult for the machine to accurately determine the user intent of Q3 based solely on this question text. Therefore, in the illustrated embodiment, the user intent of the to-be-analyzed statement is determined with reference to the to-be-analyzed statement and corresponding historical statements. By determining the user intent of the to-be-analyzed statement with reference to at least one historical statement, the occurrences of inaccurate identification of the user intent of the to-be-analyzed statement due to incompleteness and omission of the user input information in a plurality of rounds of dialog may be reduced.

However, the requirements for the number of historical statements are often different in different application scenarios. For example, on a shopping website such as Taobao or Jingdong Mall, customer service robots are often provided to answer some frequently asked questions (such as "How to return?" and "Is the postage included?") in place of customer service agents when the customer service agents are busy. This type of question is often highly independent, and the topic currently discussed may be finished generally within two or three rounds of questioning. Therefore, in this scenario, it can be set that two statements input by the user prior to the to-be-analyzed statement are the historical statements corresponding to the to-be-analyzed statement. Certainly, in another application scenario, when many statements input by the user exist in the HCI session, if the historical statements of the to-be-analyzed statement need to be determined, then the quantity of backtracked statements can be specified (e.g., five statements). Therefore, five statements input by the user prior to the to-be-analyzed statement may be used as the historical statements of the to-be-analyzed statement, and earlier statements may be ignored. Specifying the quantity of backtracked statements can reduce the number of historical statements, effectively reduce the complexity of subsequent historical statement association calculation, and improve the calculation efficiency, thereby identifying the user intent faster and more accurately, responding to the user intent quickly and accurately, and bringing a better user experience.

The number of historical statements can be customized according to the specific application scenario. Certainly, the setting of the number of historical statements also has a certain impact on the identification result. Therefore, in different scenarios, the quantity of historical statements may be fixed or vary (for example, varying as the context changes). The quantity of historical statements may be preset, or the quantity of historical statements may be optimized through constant training, so the identification accuracy is further improved in the application scenario.

Historical statements in different positions will also have certain impacts on the identification of the user intent of the to-be-analyzed statement. In the case of identical or similar semantic meanings, the historical statement with a shorter distance has a greater impact on the identification of the user intent of the analyzed statement, and the historical statement with a long distance has a smaller impact on the identification of the user intent of the analyzed statement. When the position of the historical statement is far to a certain extent, the impact of the historical statement on the identification of the user intent of the to-be-analyzed statement may be ignored. A statement interval between the historical statement at this position and the to-be-analyzed statement may be set as a preset threshold. In a possible implementation of the embodiment of the disclosure, to improve the identification accuracy of the user intent, a statement interval between the at least one historical statement and the to-be-analyzed statement may be set to be less than the preset threshold. The preset threshold may be empirically set.

S102: determine a historical vector of the to-be-analyzed statement according to a statement vector of the to-be-analyzed statement and a statement vector of the at least one historical statement.

The historical vector is a vector obtained by calculation according to the statement vector of the to-be-analyzed statement and the statement vector of the at least one historical statement, and may be regarded as a statement vector corresponding to the to-be-analyzed statement and the historical statement. The information contained in the historical vector can not only reflect the information of the at least one historical statement related to the to-be-analyzed statement, but also reflect the information of the to-be-analyzed statement to a certain extent.

The calculation process of the historical vector is not limited in the disclosure. The calculation of the historical vector may be the addition of the statement vector of the to-be-analyzed statement and the statement vector of the historical statement, or other calculation methods. For example, the statement vector of the to-be-analyzed statement is $m_n$, and the statement vectors of the historical statements are $m_1$-$m_{n-1}$, respectively; the historical vector may be a result of adding the two, namely, $m_1 + \ldots m_{n-1} + m_n$.

S103: determine the user intent of the to-be-analyzed statement according to the historical vector.

The information included in the historical vector can reflect the information of the to-be-analyzed statement, and can also reflect the information of the at least one historical statement related to the to-be-analyzed statement. Therefore, if the machine determines the user intent of the to-be-analyzed statement through the historical vector, then more and effective referable information may exist so that the identification of the user intent of the to-be-analyzed statement is more accurate. In a plurality of rounds of dialog, based on more accurate user intent, the machine can respond more accurately to the to-be-analyzed statement inputted by the user, thus bringing a better experience to the user.

In one embodiment, how to determine the user intent of the analyzed statement according to the historical vector is not limited. In general, the types of user intents are finite and can be summarized in advance. Then, when the user intent of the to-be-analyzed statement is determined according to the historical vector, the historical vector may be mapped, through certain rules, to various user intents acquired in advance. If a score or category of a certain type of user intent is the highest in the mapping, then this type of user intent can be used as the user intent of the to-be-analyzed statement.

For step S103, the information of the to-be-analyzed statement cannot always be fully reflected in the historical vector, and therefore, to determine the user intent of the to-be-analyzed statement more accurately, an additional embodiment is further provided. In this additional embodiment, a fused vector of the to-be-analyzed statement may be determined first according to the historical vector and the statement vector of the to-be-analyzed statement, and then the user intent of the to-be-analyzed statement is determined according to the fused vector. For example, the historical vector is h and the statement vector of the current to-be-analyzed statement is u. The historical vector h and the statement vector u of the to-be-analyzed statement may be fused to obtain the fused vector o. The fusing method may be simply adding the two vectors, or performing a weighted-summation after a weight is assigned to each of the two vectors according to the impacts on the intent identification, or other fusing methods may also be used. In the embodiment of the disclosure, to facilitate understanding, illustration is made by adding the two vectors, that is, o=h+u. After the fused vector is obtained, the fused vector may be mapped, through certain rules, to various user intents acquired in advance. If a score or category of a certain type of user intent is the highest in the mapping, then this type of user intent can be used as the user intent of the to-be-analyzed statement.

Obtaining the user intent by mapping the fused vector is introduced below with reference to FIG. 2.

Figure 2:
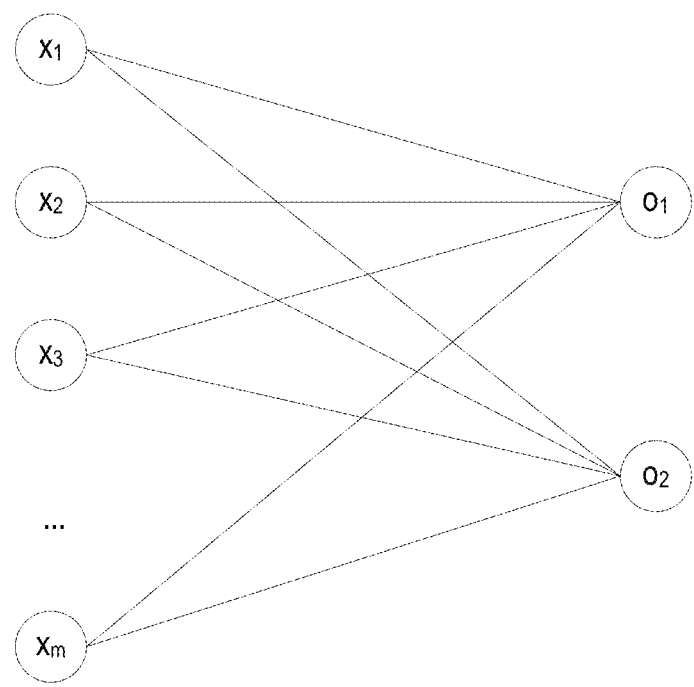
FIG. 2 is a diagram of determining a user intent according to a fused vector according to some disclosed embodiments.

In FIG. 2, two fused vectors exist, namely, $o_1$ and $o_2$. The fused vector calculated for the to-be-analyzed statement 1 is $o_1$, and the fused vector calculated for the to-be-analyzed statement 2 is $o_2$. n types of possible user intents are acquired in advance and are expressed by $x_1, x_2 \ldots x_n$, respectively, and $o_1$ and $o_2$ are each mapped to the n types of user intents by the machine to obtain scores of the various user intents. The scores of the various user intents corresponding to $o_1$ and $o_2$ are $b_{11}, b_{12} \ldots b_{1n}$ and $b_{21}, b_{22} \ldots b_{2n}$. The intent with the highest score value is the user intent of the to-be-analyzed statement. It should be noted that the mapping of the fused vector to different user intents acquired in advance may have different weights, and the weights can be obtained by training the machine.

A plurality of intent categories exists in an intent acquisition module, and are expressed by $x_1, x_2 \ldots x_n$, respectively. A mapping module maps each of $o_1$ and $o_2$ to $x_1$, $x_2 \ldots x_n$, and obtains scores of $b_1, b_2 \ldots b_n$. The intent acquisition module selects the largest score to serve as the intent of the current statement. For example, for the mapping of $o_1$, when the score of $b_2$ is the largest, $b_2$ is the user intent of the to-be-analyzed statement 1.

In the above-mentioned embodiment, the historical vector of the to-be-analyzed statement is determined by calculating the statement vector of the to-be-analyzed statement and the statement vector of the at least one historical statement, and the user intent is determined according to the historical vector of the to-be-analyzed statement. Compared with existing systems, this method fully considers the information related to the to-be-analyzed statement and included in the historical statement, so that the user intent identification is more accurate.

In some embodiments, in S102, the historical vector of the to-be-analyzed statement needs to be determined according to the statement vector of the to-be-analyzed statement and the statement vector of the at least one historical statement. During the calculation, it is necessary to consider the degrees of relevance between different historical statements and the to-be-analyzed statement. It is necessary to consider not only the semantic similarity between the historical statement and the to-be-analyzed statement but also the distance between the historical statement and the to-be-analyzed statement in the HCI session.

Generally, in the process of HCI, the content of the interaction may include a continuous process for a topic. When the same topic is discussed, the statements inputted by the user may all be related to the topic, and the statements input successively may also have certain relevance therebetween; therefore, the semantic similarity between statements discussing the same topic is generally higher. Moreover, the normal interaction generally has continuity, but the continuity does not last very long; therefore, the historical statement that is closer to the to-be-analyzed statement is more related to the to-be-analyzed statement, and is likely to discuss the same thing or the same topic; the historical statement far away from the to-be-analyzed statement may have very low relevance with the to-be-analyzed statement, and is likely to discuss a different thing or a different topic.

Therefore, the historical statement closer to the to-be-analyzed statement in the HCI session will have a greater impact on the intent identification. Certainly, considering only the positional relationship between the historical statement and the to-be-analyzed statement is insufficient, and the semantic similarity between the historical statement and the to-be-analyzed statement needs to be considered as well when the user intent of the to-be-analyzed statement is determined, to achieve more accurate intent identification. Therefore, when the to-be-analyzed statement is determined, a historical statement that is far away from the to-be-analyzed statement but has a high semantic similarity can be prevented from being used as a main reference for determining the user intent of the to-be-analyzed statement, because this type of historical statement that is far away from the to-be-analyzed statement may be discussing a thing or topic different from that of the to-be-analyzed statement. If the historical statement is used as the main reference for determining the user intent of the to-be-analyzed statement, then the determined user intent may be inconsistent with the actual user intent of the to-be-analyzed statement. Illustration is made below through an example with reference to a specific scenario:

Q1: What's the weather like in Ürümqi tomorrow?
A1: xxx.
Q2: What about the day after tomorrow?
A2: xxx.
Q3: What scenic spots are there in Hangzhou?
A3: xxx.
Q4: What about Shanghai?
A4: xxx.

It is assumed that a to-be-analyzed statement is Q4 "What about Shanghai," and Q1 to Q3 are historical statements of Q4. Since two user intents can be determined from the three historical statements, one is to query the scenic spots and the other is to query the weather, which may both be related to Q4. If the positional relationship that the historical question of querying the scenic spots appears closer to the to-be-analyzed statement is not considered, then it is likely that the weather query is incorrectly identified as the intent of Q4.

Considering the impact of the positional relationship of the historical statement on the user intent identification, for S102, a method for determining the historical vector of the to-be-analyzed statement according to the statement vector of the to-be-analyzed statement and the statement vector of the historical statement is provided in the disclosed embodiments.

Figure 3:
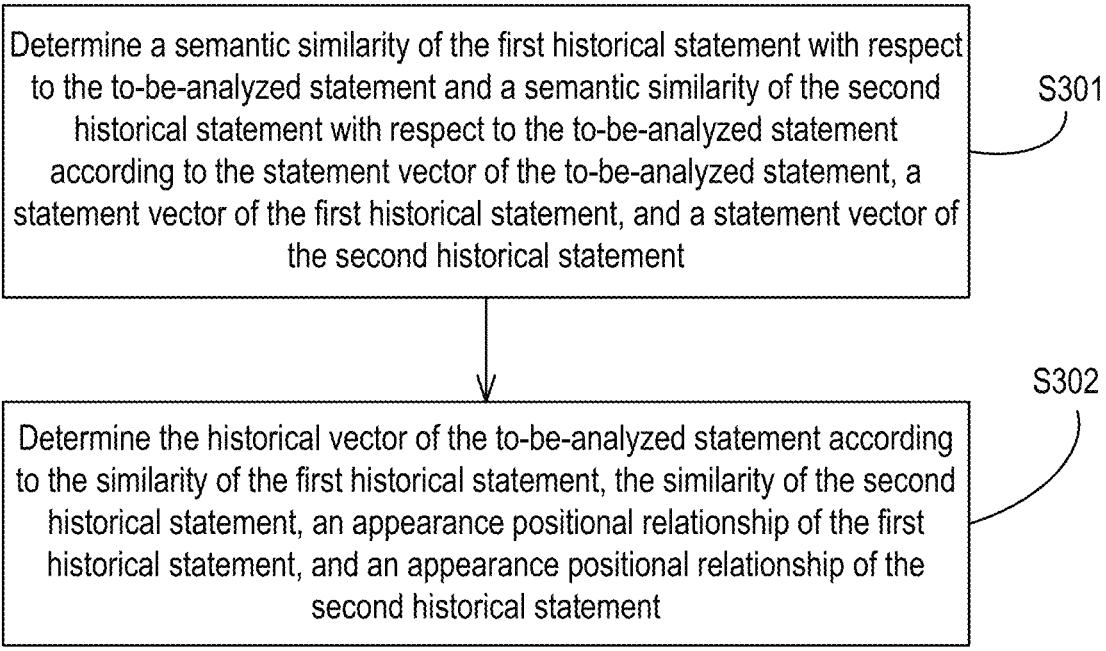
FIG. 3 is a flow diagram illustrating a method for identifying a user intent of a statement according to some disclosed embodiments.

The method for determining the historical vector according to the statement vector of the to-be-analyzed statement and the statement vector of the historical statement in the embodiment of the disclosure is introduced below with reference to FIG. 3. One historical statement or a plurality of historical statements may exist. The method for determining the historical vector according to the statement vector of the to-be-analyzed statement and the statement vector of one historical statement is similar to the method for determining the historical vector according to the statement vector of the to-be-analyzed statement and the statement vectors of a plurality of historical statements. The method for determining the historical vector according to the statement vector of the to-be-analyzed statement and the statement vectors of a plurality of historical statements is introduced below. When the quantity of historical statements is one, reference can be made to the method for a number of historical statements, and details will not be described herein again.

The plurality of historical statements includes a first historical statement and a second historical statement. In this embodiment, illustration is made by taking the first historical statement and the second historical statement as an example, but the disclosure is not limited to the first historical statement and the second historical statement. The method includes the following steps:

S301: determine a semantic similarity of the first historical statement for the to-be-analyzed statement and a semantic similarity of the second historical statement for the to-be-analyzed statement according to the statement vector of the to-be-analyzed statement, a statement vector of the first historical statement, and a statement vector of the second historical statement.

The semantic similarity is a concept that represents the degree of association between two statements from a semantic perspective. For example, the level of semantic similarity of the first historical statement for the to-be-analyzed statement means the degree of association between the first historical statement and the to-be-analyzed statement from the semantic perspective. The semantic similarity can be determined through the statement vector of the first historical statement and the statement vector of the to-be-analyzed statement.

The method for determining the semantic similarity of the first historical statement for the to-be-analyzed statement and the semantic similarity of the second historical statement for the to-be-analyzed statement is not limited in the embodiment of the disclosure, and a feasible implementation is to find distribution of degrees of association of a plurality of historical statements for the to-be-analyzed statement.

For example, the statement vector of the to-be-analyzed statement is u and the statement vector of the historical statement is $m_i$. Specifically, in the embodiment of the disclosure, the statement vectors of the first historical statement and the second historical statement may be $m_1$ and $m_2$, respectively; the semantic similarity of the historical statement for the to-be-analyzed statement is $p_i$, and a distribution of the semantic similarity of the historical statement for the to-be-analyzed statement can be acquired, that is, $p_i=\text{softmax}(m_iu^T)$, where $m_iu^T$ represents an inner product of the statement vector of the historical statement and the statement vector of the current to-be-analyzed statement. Herein, T means transposition and represents a vector resulting from transposition of the statement vector, that is, an original row vector form is transformed into a column vector form. The function of the softmax function is normalization, so that $$\sum_i P_i = 1.$$

The normalization functions to display the result of semantic similarity more intuitively. In another embodiment of the disclosure, normalization may not be performed, that is, another distribution of the semantic similarity is $p_i=m_iu^T$. Whether the normalization is performed does not affect the implementation of the embodiment of the disclosure.

A preferred implementation solution for calculating the semantic similarity is to select a numpy package in the Python programming language or the Jama package in the Java programming language for matrix calculation of $m_iu^T$, where the numpy package and the Jama packages each comprise a set of classes for performing vector or matrix calculation in the corresponding programming language. Then, the softmax function can be called for normalization processing. A greater value of $p_i$ indicates a higher degree of association between the historical statement i and the to-be-analyzed statement, and more similar the historical statement i is to the to-be-analyzed statement. In contrast, a smaller value of $p_i$ indicates a lower degree of association between the historical statement i and the to-be-analyzed statement, and less similar the historical statement i is to the to-be-analyzed statement.

The semantic similarity is calculated through the inner product of the statement vector of the historical statement and the statement vector of the to-be-analyzed statement. On the one hand, historical information is fully considered, and the statement vectors of various historical statements can be calculated simultaneously. On the other hand, the matrix calculation of the inner product can be performed by directly calling the function, and the implementation process is relatively simple, thereby improving the calculation efficiency, and quickly obtaining a result of similar semantic meaning.

S302: determine the historical vector of the to-be-analyzed statement according to the similarity of the first historical statement, the similarity of the second historical statement, an appearance positional relationship of the first historical statement, and an appearance positional relationship of the second historical statement.

The positional relationship can be used to represent the distance between the historical statement and the to-be-analyzed statement in the HCI session. From the perspective of the positional relationship, the historical statement closer to the to-be-analyzed statement has a greater impact on the user intent identification. Calculating the historical vector with reference to the positional relationship can result in a more accurate result of the user intent identification. If the positional relationship of the historical statement is ignored, then when two or more historical statements with similar semantic similarities exist among the historical statements, the accuracy of the user intent identification may be reduced.

The positional relationship may be reflected in a plurality of manners and may be a difference of line numbers between the current historical statement and the to-be-analyzed statement, or other forms of expression. The method for reflecting the positional relationship will not affect the implementation of the embodiment of the disclosure.

One implementation of reflecting the positional relationship is to use $pos_i$ to represent the position of the $i^{th}$ historical statement for the to-be-analyzed statement in an HCI session, and $q_i$ represents the positional relationship, where $q_i = \text{softmax}(pos_i)$. Certainly, the normalization may not be performed, and whether the normalization is performed will not affect the implementation of the embodiment of the disclosure. For example, in the scenario of querying the weather in Ürümqi, "What's/the weather/like/in/Ürümqi/tomorrow" is the first historical question, $pos_1=0$, and so on. In the second and third historical statements, $pos_2=1$, $pos_3=2$, and calculation is performed according to $q_i = \text{softmax}(pos_i)$, so that $q_1=0.09$, $q_2=0.24$, and $q_3=0.67$ can be obtained. As can be seen from this example, the historical statement closer to the to-be-analyzed statement has a higher weight of the positional relationship. How to set the value of $pos_i$ is not limited in the embodiment of the disclosure, as long as the positional relationship between the historical statement and the to-be-analyzed statement can be reflected.

The historical vector of the to-be-analyzed statement is determined according to the similarity of the first historical statement, the similarity of the second historical statement, the appearance positional relationship of the first historical statement, and the appearance positional relationship of the second historical statement. The process of determining the historical vector is not limited in the disclosure and may be performed by adding the semantic similarity of the statement to the positional relationship or multiplying the semantic similarity of the statement by the positional relationship, or in other calculation manners.

One implementation of calculating the historical vector is to obtain an average of the similarity of the historical statement for the to-be-analyzed statement and the corresponding positional relationship of the historical statement to serve as a coefficient of the statement vector of the historical statement. To facilitate the expression and subsequent reference, the coefficient is represented by $\alpha_i$, the semantic similarity of a historical statement $m_i$ for the to-be-analyzed statement u is $p_i$; the positional relationship is $q_i$; then, the coefficient of the statement vector $m_i$ of the historical statement is $\alpha_i=(p_i+q_i)/2$. Then, the product of the historical vector $m_i$ and a coefficient $\alpha_i$ thereof is summed to obtain a historical vector, and the historical vector is represented by h. A formula of calculating the historical vector can be obtained as follows $$h = \sum_i \alpha_i m_i$$

The coefficient of the statement vector of the historical statement needs to be calculated with reference to the semantic similarity and the positional relationship. Considering only the semantic similarity or only the positional relationship will lead to inaccurate user intent identification. If the positional relationship is ignored, when at least two historical statements with similar semantic similarities exist in the session, if the historical statement that is far away from the to-be-analyzed statement is used as the main reference, then the determined user intent is likely to inconsistent with the actual user intent. If the semantic similarity is ignored, and only the positional relationship is considered and the historical statement closer to the to-be-analyzed statement is used as the main reference, if the closer historical statement has a lower semantic similarity for the to-be-analyzed statement, then the determined user intent is likely to be inconsistent with the actual user intent. Therefore, when the historical vector is calculated, the semantic similarity and the positional relationship of the historical statement for the to-be-analyzed statement should be fully considered, that is, the coefficient of the statement vector of the historical statement should be determined according to the semantic similarity and the positional relationship of the historical statement for the to-be-analyzed statement. It should be clear that the historical vector h is actually a concentration of useful information contained in the statement vectors of the various historical statements. The statement vector of the historical statement having a greater weight, namely, greater $a_i$, will have a greater impact on the entire historical vector. The historical vector directly affects the result of the user intent identification, and therefore, the accurate calculation of the coefficient $a_i$ is particularly important.

In other implementations of the disclosure, averaging may not be performed; weights may be assigned to the semantic similarity and the positional relationship respectively, and summation, multiplication, or other calculation methods may be performed. The method for calculating the coefficient of the statement vector of the historical statement will not affect the implementation of the embodiment of the disclosure. The averaging is for the convenience of the calculation. Specifically, in an actual application scenario, an adapted mathematical model may be established according to the features of the scenario, and different parameters are defined. The parameters may also be preset or may be obtained by repeated training and optimization. The parameters obtained by training and optimization can result in a more accurate historical vector calculation, thereby improving the accuracy of the user intent identification, and bringing a better experience to the user.

In the above-mentioned embodiment, the historical vector is calculated with reference to the semantic similarity and the positional relationship of the historical statement for the to-be-analyzed statement, and the user intent is determined according to the historical vector, thus reducing the risk of obtaining a user intent inconsistent with the actual intent of the user caused by considering only the semantic similarity or positional relationship. Therefore, the user intent identification is more accurate, and the machine can respond precisely according to the more accurate intent, thus bringing a better experience to the user.

Embodiment 2

In this embodiment, illustration is made mainly on how to perform entity labeling on word segments in a statement. The solution in this embodiment may be implemented based on Embodiment 1, or may be implemented after the historical vector of the to-be-analyzed statement is determined.

In the embodiment of the disclosure, to make an accurate response, in addition to identifying the user intent, an entity in the user's question needs to be identified and labeled. Specifically, in the above-mentioned scenario of weather query, entity labeling is shown in Table 1 below. Table 1 is a schematic table for identifying a user intent:

TABLE 1

| What's | tomorrow | Ürü | mqi | in | the weather | like |
|---|---|---|---|---|---|---|
| O | B-Day | I-Place | I-Place | O | O | O |

The first row in the table indicates word segmentation on the statement, and the second row indicates labeling. In the "BIO" system, B identifies the start of the entity, and I identifies the middle of the entity, and O is meaningless. After the above-mentioned entities are labeled, a response similar to the following can be made:
Q1: What's the weather like in Ürümqi tomorrow?
A1: Ürümqi will be cloudy to sunny tomorrow, and the temperature will be 12 to 20 degrees.
Q2: What about the day after tomorrow?
A2: Ürümqi will be overcast the day after tomorrow, and the temperature will be 12 to 18 degrees.
Q3: What about Shanghai?
A3: Shanghai will be rainy the day after tomorrow, and the temperature will be 15 to 17 degrees.

The above-mentioned entity labeling also needs to be performed with reference to the semantic meanings of the historical statements; otherwise, Q2 and Q3 cannot be answered accurately.

In addition to considering the semantic meanings of the historical statements, positional relationships thereof also need be considered as well. Historical statements in different positions may produce different results. The following scenario is considered:
Q: What movies did Zhao Wei play in?
A: . . . .
Q: What about Jay Chou?
Q: What songs did Xu Song sing?
A: . . . .
Q: What about Jay Chou?

"What about Jay Chou?" exists in both the two rounds of dialog. If historical information is not considered, then it will be completely clueless about how to label the word "Jay Chou," but if the historical information is considered and the position of historical information is also referred to, then the model can clearly label the first Jay Chou as B-Actor and the second one as B-Singer. If the position is not considered, then Jay Chou in the second round of dialog may be labeled as a B-Actor incorrectly.

Based on the same reason as that given for the user intent identification, if the semantic meaning of the historical statement and the position information of the historical statement are not referred to, then the accuracy of entity labeling in the conventional method is caused to be relatively low. In addition, because the intent identification and the entity labeling are performed separately, resources cannot be shared, and the intent identification and the entity labeling cannot be performed synchronously, so that the machine needs to spend twice the time to perform the intent identification and the entity labeling separately, resulting in a waste of resources and low efficiency.

Considering the function of the entity labeling in responding to the user intent in a plurality of rounds of session, a method for determining an entity type of the word segment in the to-be-analyzed statement after the historical vector of the to-be-analyzed statement is determined according to the statement vector of the to-be-analyzed statement and the statement vectors of the plurality of historical statements is provided in another embodiment of the disclosure.

Figure 4:
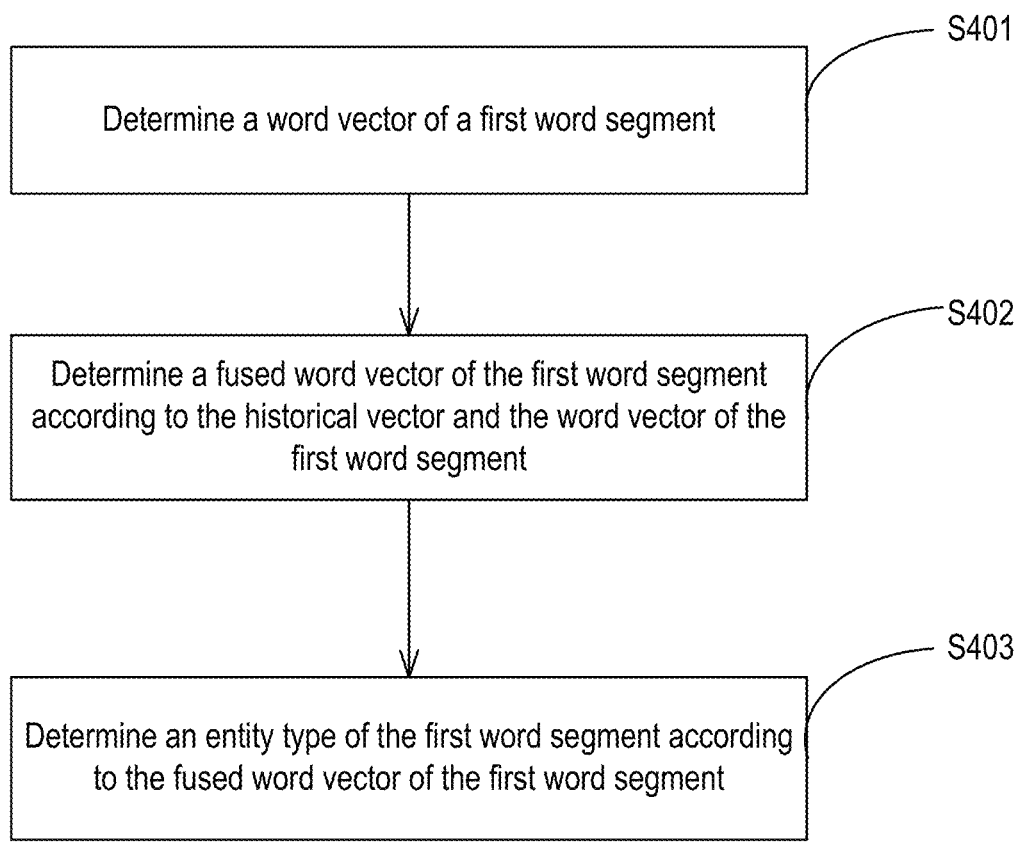
FIG. 4 is a flow diagram illustrating a method for labeling a word segment type of a to-be-analyzed statement according to some disclosed embodiments.

The determination of the entity type of the word segment of the to-be-analyzed statement in the embodiment of the disclosure is introduced below with reference to FIG. 4. In the determination of the entity type of the word segment of the to-be-analyzed statement, the to-be-analyzed statement includes at least one word segment. The determination of the entity type of the first word segment is illustrated to facilitate subsequent reference and introduction of the solution. The first word segment is one of the at least one word segment, and has no sequential relationship with other word segments. The process of determining the entity type of another word segment is the same as that of the first word segment, and details will not be described herein again. After the historical vector of the to-be-analyzed statement is determined through S102, the method includes the following steps:

S401: determine a word vector of the first word segment.

Therefore, before an entity type of a word segment contained in a statement is labeled, it is necessary to decompose the statement first to acquire at least one word segment. The word segment may be a meaningful entity or a meaningless auxiliary word. The word segment is a relatively abstract concept and is relatively difficult for a machine to understand. Therefore, it is very necessary to convert the word segment into a concrete concept understandable by the machine. The concept understandable by the machine may be a word vector. The word vector of a word segment is obtained by converting the word segment into the form of a vector, and it contains all information of the word segment. Alternatively, when other word segments prior to the word segment exist in the statement where the word segment is located, the word vector of the word segment may further contain all information of the other word segments in addition to all the information of the word segment.

In the embodiment of the disclosure, the word vector may be obtained by performing RNN encoding on the word segment. Due to the memorability of an RNN, the last word segment of the statement contains the information of all previous word segments, and the word vector of the last word segment can be used as the statement vector of the statement. Specifically, if n word segments exist in the current to-be-analyzed statement, n being a positive integer greater than or equal to 1, then word vectors $c_1, c_2 \ldots c_n$ can be obtained by RNN encoding.

Before the RNN encoding is performed on the word segments, the word segments can be encoded first and the word segments are mapped to a space of fixed dimensions. In the space, the word segments of similar meanings are close to each other so that semantic meanings can be better expressed. In the embodiment of the disclosure, a Word2vec encoding method is adopted, and another encoding method such as one-hot encoding may also be adopted. The encoding method will not affect the implementation of the embodiment of the disclosure.

S402: determine a fused word vector of the first word segment according to the historical vector and the word vector of the first word segment.

The storical vector is the historical vector described in the vectors of S102 and/or S302, and the method for acquiring the historical vector is the same as that in the first embodiment and the second embodiment, and details will not be described herein again. The word vector of the first word segment is the word vector in S401. The fused word vector is a new vector obtained by integrating the information included by the current word vector and the information included by the historical vector. The integration of the information included by the historical vector and the information included by the current word vector may be understood as an aggregation of effective referable information and removal of irrelevant information.

The fusing is a process of integrating the information of the historical vector and the information of the current word vector. A plurality of fusing methods exists, which are not limited in the disclosure. The fusing may be performed by adding the vectors, or the fusing may be performed by an inner product of the vectors or by a matrix, or by other methods for integrating information. The fusing method will not affect the implementation of the embodiment of the disclosure.

The function of determining the fused vector is to integrate the information included by the historical vector and the information included by the current word vector, to classify the current word segment, namely, the first word segment or determine the entity type with reference to the historical information, thus avoiding the problem of the relatively low accuracy of labeling the word segment in the prior art caused by considering only a current statement without referring to the context. On the other hand, the fused word vector is calculated according to the historical vector; the historical vector has been calculated in the process of identifying the user intent and can be used directly when the entity type is determined, thereby achieving resource sharing. In addition, the process of user intent identification and the process of entity type labeling do not interfere with each other and can be performed synchronously, thereby improving the calculation efficiency, shortening the time required for responding to the user, and achieving a better user experience effect.

For example, the current to-be-analyzed statement has three word segments: word vectors of the word segments are respectively $c_1$, $c_2$, and $c_3$, and a historical vector is h. Fused vectors corresponding to the three word segments may be $c_{1+h}$, $c_{2+h}$, and $c_{3+h}$. The process of fusing the word vectors may be performed in synchronization with the process of fusing vectors in the process of user intent identification, thereby improving the calculation efficiency. Certainly, the fused word vector in the example is a fused word vector obtained by simple addition for the convenience of description. Specifically, in practical applications, different fusion models may be established according to different application scenarios, to obtain more accurate fused word vectors, and then more accurately determine entity types of the word segments.

S403: determine the entity type of the first word segment according to the fused word vector of the first word segment.

The determination of the entity type of the first word segment according to the fused word vector of the first word segment may be regarded as determining, with reference to the information included by the fused word vector, an entity type having the highest degree of association with the first word segment among a plurality of entity types. The degree of association may be a degree of association obtained with reference to the word meaning and the positional relationship.

The function of determining the entity type of the first word segment through the fused word vector is that the entity type of the word segment can be determined more accurately with reference to the historical information in the fused word vector, to overcome the problem in the prior art that the entity type is incorrectly labeled without referring to the context.

Specifically, in the embodiment of the disclosure, the fused word vector may be mapped to different entity type modules through a mapping module, and scores of the various entity type modules are obtained. The entity type of the module with the highest score is the entity type of the first word segment. The method for determining the entity type of the first word segment is not limited to mapping, and other methods may also be used to determine the entity type. The determining method will not affect the implementation of the embodiment of the disclosure.

For example, the fused word vector of a word segment is $o_1=c_1+h$. n types of possible entity types are acquired in advance, and are represented by $x_1, x_2, \ldots x_n$, respectively. For example, B-day, B-place, and B-singer may be included. The machine maps the fused word vector $o_1$ to the n entity types and obtains scores of the various entity types. The scores of the various entity types corresponding to $o_1$ are $b_{11}$, $b_{12}, \ldots b_{1n}$, and the scores of the various entity types are summed separately, where the entity type with the highest score is the entity type of the word segment.

In S403, the workload of determining an entity type from a plurality of entity types is relatively heavy. In a statement having a plurality of word segments, the statement including the first word segment and the second word segment is taken as an example herein, and if the first word segment is located after the second word segment, and the type of the second word segment is O, which means meaningless, then according to the dependency relationship that "O must be followed by O or B, rather than I," the type of the first word segment being I is excluded. If the determination is performed still according to step S302, then unnecessary time is wasted, and a wrong result may be obtained, thus reducing the efficiency.

To overcome the problems of low entity type identification accuracy and low efficiency caused by ignorance of the entity type dependency relationships between word segments in a statement having a plurality of word segments, the following improvement may be made to S403.

The entity type of the first word segment is determined according to the fused word vector of the first word segment, a fused word vector of the second word segment, and a pre-learned entity type dependency relationship.

The determination of the entity type according to the fused word vector is essentially a process of selecting the entity type with the highest degree of association with the word segment from a plurality of entity types with reference to the fused word vector. Then, according to the pre-learned entity type dependency relationship, the scope of selection can be reduced first, thereby reducing the amount of calculation, reducing the complexity of the model, and improving the efficiency. Therefore, the response time can be further shortened, thus bringing a better user experience. Obviously, a huge difference in user experience between the response time of 3 seconds and the response time of 10 minutes exists.

Therefore, adding the entity type dependency relationship greatly improves the determination of the entity type.

Those of ordinary skill in the art can understand that all or part of the steps of the above-mentioned method embodiments can be implemented by a program instructing related hardware. The foregoing program includes functional modules corresponding to the method steps. When the program is executed, the steps of the above-mentioned method embodiment are performed.

Figure 5:
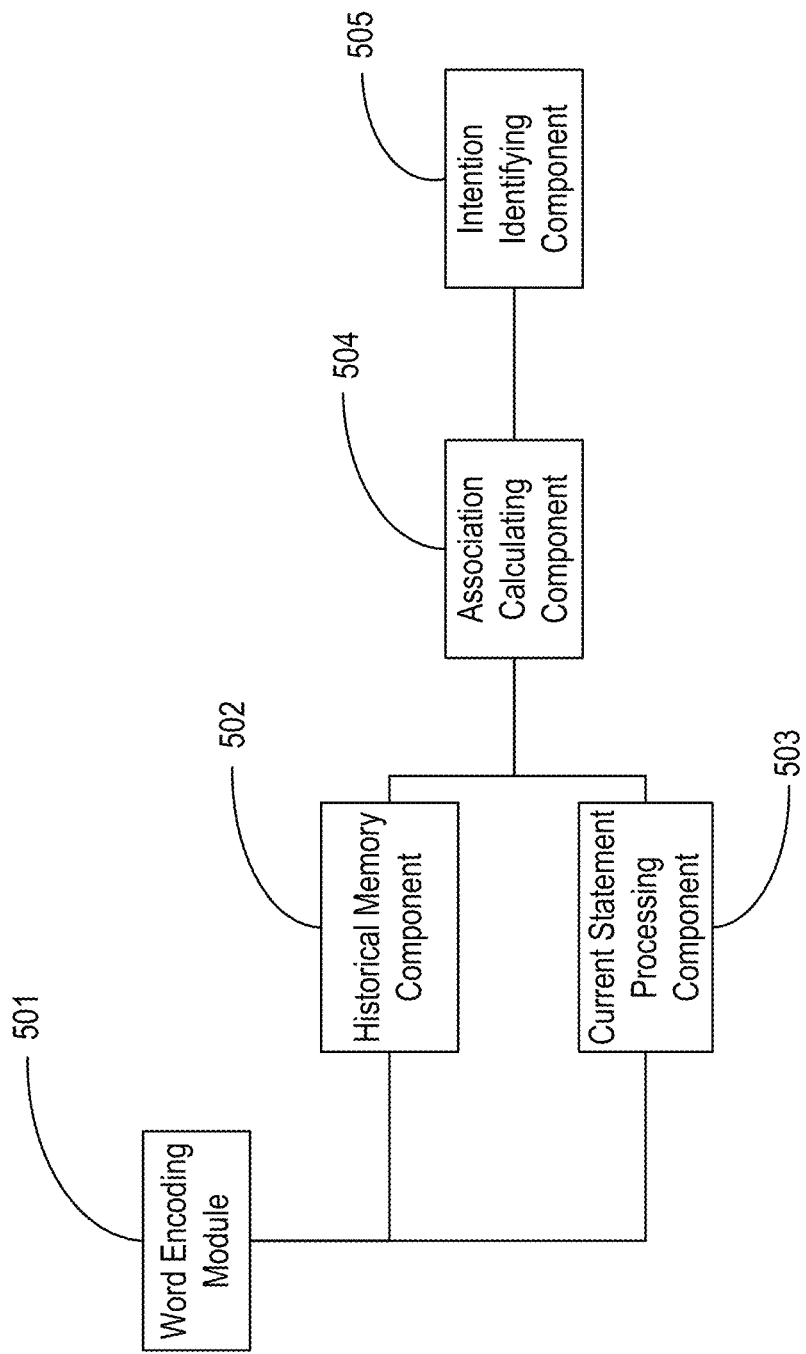
FIG. 5 is a block diagram of a program for identifying a user intent of a statement according to some disclosed embodiments.

The program may include a word encoding module 501, a historical memory component 502, a current statement processing component 503, an association calculating component 504, and an intent identifying component 505 as shown in FIG. 5. An entity labeling component may further be added for entity labeling. Certainly, in other implementations of the disclosure, other functional modules may also be used to perform the steps of the above-mentioned method embodiments, which is not limited in the disclosure.

The word encoding module mainly encodes the word segment of the statement, so that the historical memory component and the current statement processing component perform RNN encoding on the encoded word segment conveniently to obtain a statement vector of a historical statement and a statement vector of a to-be-analyzed statement, respectively. The historical memory component may also specify the quantity of backtracked statements. In a session where the to-be-analyzed statement is located, when the quantity of statements inputted by a user is large, the quantity of backtracked statements is specified. For example, if the quantity of backtracked statements is specified to 5, then 5 statements prior to the to-be-analyzed statement are used as historical statements of the to-be-analyzed statement, and statements prior to the 5 statements will be ignored and will not be subjected to RNN encoding. The reduction of the number of historical statements can effectively reduce the complexity of the calculation of a historical vector, thereby improving the calculation efficiency. The key calculating component, on the one hand, obtains the semantic similarity between the historical statement and the to-be-analyzed statement according to the statement vector of the historical statement in the historical memory component and the statement vector of the to-be-analyzed statement in the current statement processing component, and on the other hand, encodes positions of the various historical statements to obtain position weights, and fuses the semantic similarity and the position weights to obtain a historical vector. To display the historical vector more intuitively, the historical vector may further be normalized. The association calculating component actually performs step S102 or steps S301 and S302. The intent identifying component identifies the user intent of the current to-be-analyzed statement from a plurality of intents according to the historical vector in the association calculating component and the statement vector of the to-be-analyzed statement in the current statement processing, that is, performs step S103.

Figure 6:
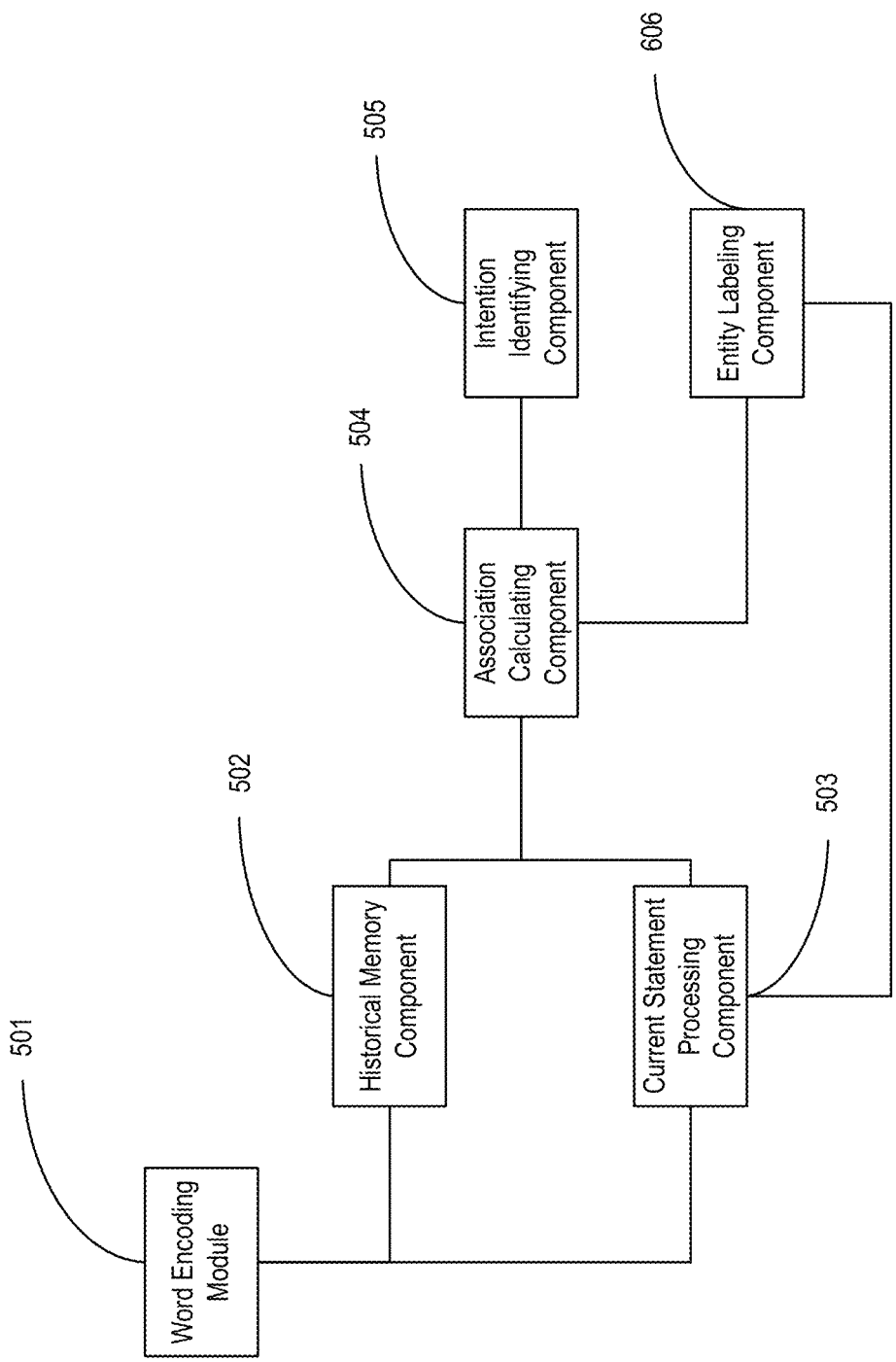
FIG. 6 is a block diagram of a program for implementing user identification and entity labeling of a statement according to some disclosed embodiments.

To implement the entity labeling function, in addition to the above, the entity labeling component may also be added to the program. As shown in FIG. 6, the entity labeling component 606 is connected to the association calculating component 504 and the current statement processing component 503 separately. The historical vector outputted by the association calculating component 504 and the word vector outputted by the current statement processing component 503 can be used as inputs of the entity labeling component 606.

Figure 7:
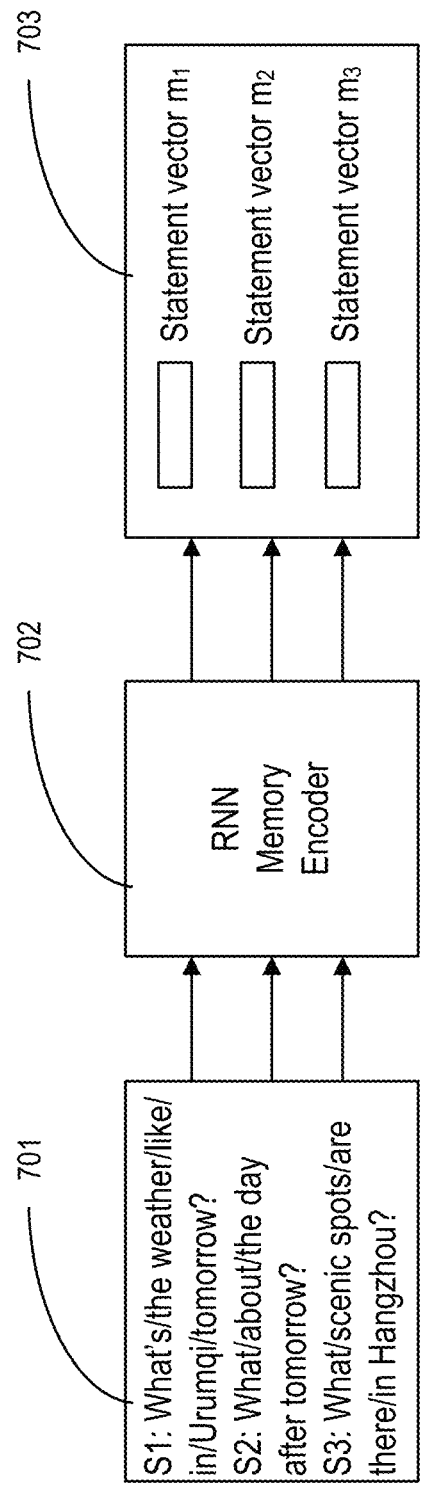
FIG. 7 is a block diagram of a historical memory component according to some disclosed embodiments.

The historical memory component is described below with reference to FIG. 7. The structure of the historical memory component is as follows:

The historical memory component is mainly divided into three modules, including a historical statement input module 701, an encoder module 702, and a statement vector output module 703. The historical statement of the to-be-analyzed statement is inputted into the historical statement input module, the encoder performs RNN encoding on the historical question, and the statement vector output module outputs a statement vector obtained by the encoder after encoding.

The historical memory component is illustrated below by taking the application scenario of weather query as an example:

First, historical statements are inputted:

s1: What's the weather like in Ürümqi tomorrow?
s2: What about the day after tomorrow?
s3: What scenic spots are there in Hangzhou?

Next, the RNN Memory Encoder encodes the input historical questions to obtain output vectors $m_1$, $m_2$, and $m_3$ of the various historical questions.

Finally, the statement vector output module outputs the statement vectors $m_1$, $m_2$, and $m_3$ of the historical statements.

Figure 8:
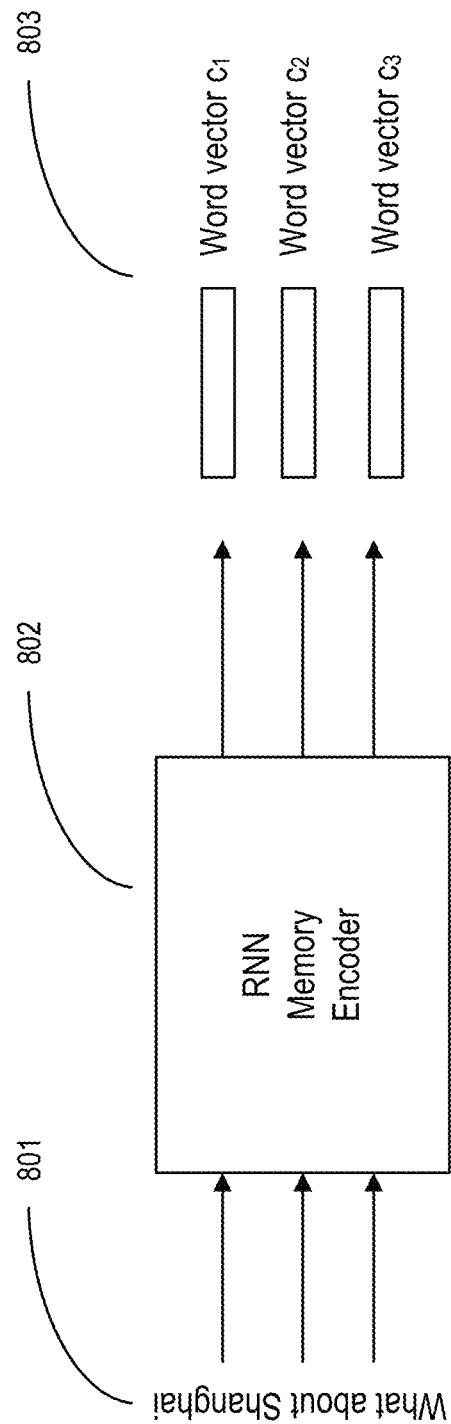
FIG. 8 is a block diagram of a current statement processing component according to some disclosed embodiments.

The current statement processing component is described below with reference to FIG. 8. The structure of the current statement processing component is as follows.

The current statement processing component is mainly divided into three modules, including a current statement input module 801, an encoder module 802, and a word vector output module 803. The to-be-analyzed statement that has been word segmented is inputted to the current statement input module, and the encoder module performs recurrent neural network encoding on the current statement, namely, the to-be-analyzed statement, to acquire word vectors corresponding to the various word segments, where the last word vector is the statement vector of the current statement.

The current statement processing module is illustrated below by taking the statement "What about Shanghai" in the weather query as an example:

First, the current statement that has been word segmented is inputted: What/about/Shanghai?

Next, the encoder performs recurrent neural network encoding on the word segments in the input module, to obtain word vectors corresponding to the various word segments, namely, $c_1$, $c_2$, and $c_3$.

Finally, the output module outputs the word vectors corresponding to the various word segments in the current statement. It should be noted that $c_3$ is also the statement vector of the statement.

The intent identifying component is described below.

The intent identifying component is mainly divided into three modules, including an input module, a mapping module, and an intent acquisition module. A fused vector carrying historical information of the current statement is inputted into the input module. The fused vector is mapped by the mapping module to various categories in the intent acquisition module, and the intent acquisition module performs judgment according to scores of the various categories and determines the user intent. The mapping module is a core module of the intent identifying component. The mapping module is described below with reference to FIG. 2.

For example, in FIG. 2, two fused vectors exist, namely, $o_1$ and $o_2$. A plurality of categories exist in the intent acquisition module, and are represented by $x_1$, $x_2$ ... $x_n$, respectively. The mapping module maps $o_1$ and $o_2$ to $x_1, x_2 \ldots x_n$, and obtains scores of $b_1, b_2 \ldots b_n$. The intent acquisition module selects the one having the largest score as the intent of the current statement. For example, for the fused vector $o_1$, when the score of $b_2$ is the largest, $b_2$ is the user intent of the to-be-analyzed statement.

The entity labeling component actually performs steps S402 and S403, and step S401 is performed by the current statement processing component. The entity labeling component obtains the fused word vector according to the word vector in the current statement processing component and the historical vector in the association calculating component and then determines the entity type of the word segment according to the fused word vector.

Figure 9:
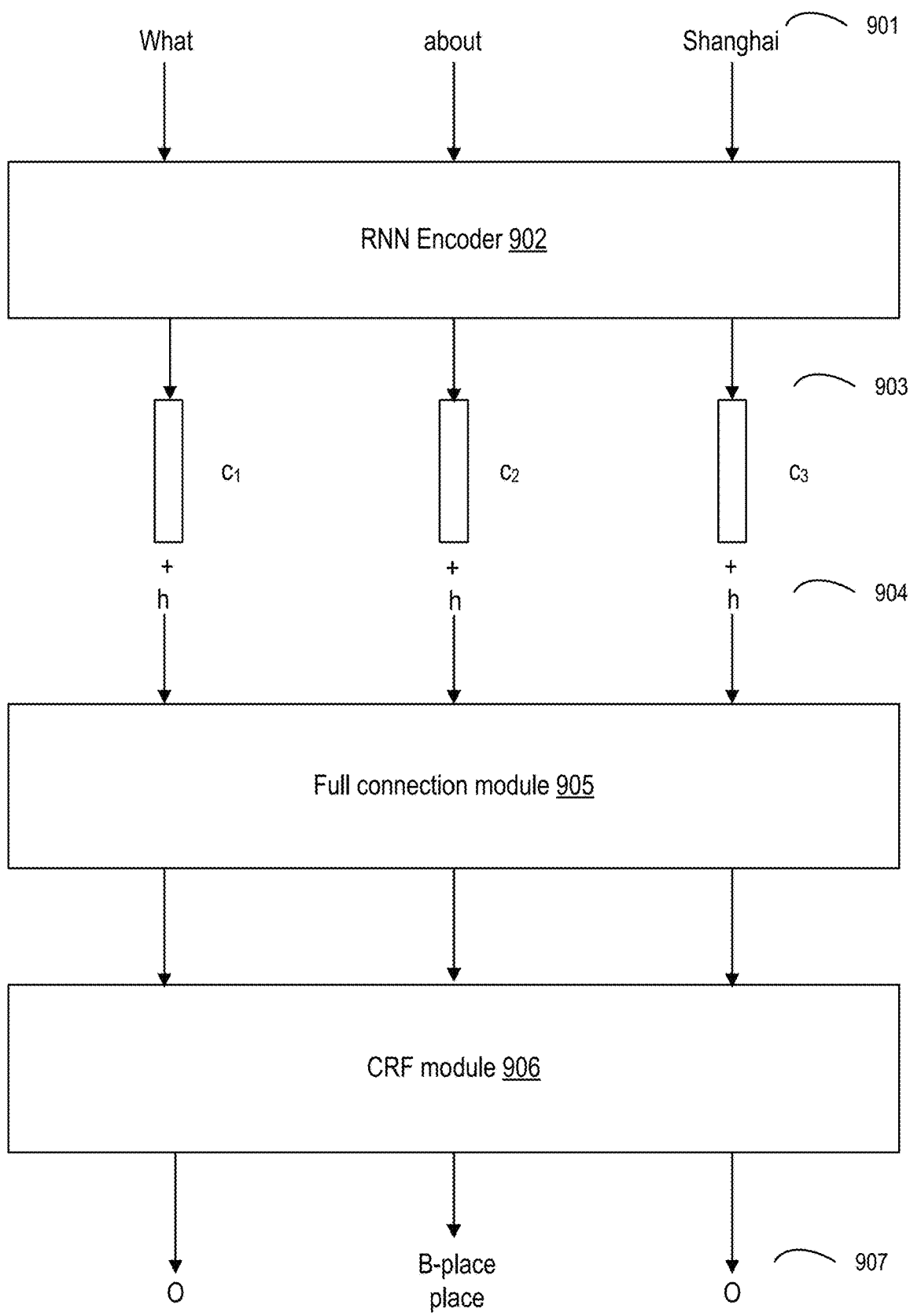
FIG. 9 is a block diagram of an entity labeling component according to some disclosed embodiments.

The entity labeling component is described below with reference to FIG. 9. The structure of the entity labeling component is as follows.

The entity labeling component mainly includes a current statement input module 901, an encoder module 902, a word vector output module 903, a word vector fusing module 904, a full connection module 905, a CRF module 906, and an entity labeling module 907. The current statement input module inputs the current statement that has been word segmented. The current statement input module, the encoder module, the word vector output module, and the current statement processing component can be shared. The word vector fusing module fuses the word vector and the historical vector to obtain a fused word vector. The full connection module combines features of the fused word vector, and the combined features enter the CRF module to learn a network impact between a global feature and a labeling result, that is, a dependency relationship between entities such as "O must be followed by O or B, rather than I." A final label score of each word is outputted, and the system selects a label with the highest score as the final label of the current word.

Figure 10:
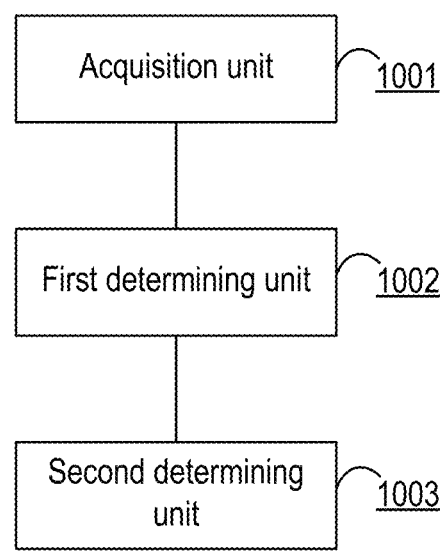
FIG. 10 is a block diagram of an apparatus for identifying a user intent of a statement according to some disclosed embodiments.

Based on the method for identifying a user intent of a statement provided in the above-mentioned embodiment, an apparatus for identifying a user intent of a statement is further provided in the embodiments of the disclosure, as shown in FIG. 10. FIG. 10 is a block diagram of an apparatus for identifying a user intent of a statement according to an embodiment of the disclosure, and the apparatus can be applied in an HCI session. The HCI session includes a plurality of statements. The apparatus includes an acquisition unit 1001, a first determining unit 1002, and a second determining unit 1003, where: the acquisition unit 1001 acquires a to-be-analyzed statement and at least one historical statement corresponding to the to-be-analyzed statement from the plurality of statements, where the at least one historical statement is a statement appearing prior to the to-be-analyzed statement in the HCI session; the first determining unit 1002 determines a historical vector of the to-be-analyzed statement according to a statement vector of the to-be-analyzed statement and a statement vector of the at least one historical statement, where the historical vector includes information related to the to-be-analyzed statement in the at least one historical statement; and the second determining unit 1003 determines a user intent of the to-be-analyzed statement according to the historical vector.

In one embodiment, a plurality of to-be-analyzed statements exist, and the plurality of to-be-analyzed statements are the last plurality of statements in an interaction order among the plurality of statements.

In one embodiment, a statement interval between the at least one historical statement and the to-be-analyzed statement is less than a preset threshold.

In one embodiment, the first determining unit 1002 includes a semantic similarity determining subunit, a positional relationship determining subunit, and a historical vector determining subunit, where: the semantic similarity determining subunit, when the at least one historical statement includes a plurality of historical statements and the plurality of historical statements include a first historical statement and a second historical statement, determines a semantic similarity of the first historical statement for the to-be-analyzed statement and a semantic similarity of the second historical statement for the to-be-analyzed statement according to the statement vector of the to-be-analyzed statement, a statement vector of the first historical statement, and a statement vector of the second historical statement; the positional relationship determining subunit determines an appearance positional relationship between the first historical statement and the to-be-analyzed statement as well as an appearance positional relationship between the second historical statement and the to-be-analyzed statement in the HCI session; and the historical vector determining subunit determines the historical vector of the to-be-analyzed statement according to the semantic similarity of the first historical statement, the semantic similarity of the second historical statement, the appearance positional relationship of the first historical statement, and the appearance positional relationship of the second historical statement.

In one embodiment, the second determining unit 1003 includes a fused vector determining subunit and a user intent determining subunit, where: the fused vector determining subunit determines a fused vector of the to-be-analyzed statement according to the historical vector and the statement vector of the to-be-analyzed statement; and the user intent determining subunit determines the user intent of the to-be-analyzed statement according to the fused vector.

In one embodiment, the fused vector determining subunit weighted-sums the historical vector and the statement vector of the to-be-analyzed statement to obtain the fused vector of the to-be-analyzed statement.

In one embodiment, the user intent determining subunit includes a mapping subunit and a determining subunit, where: the mapping subunit maps the fused vector to a plurality of preset user intents; and the determining subunit determines the user intent of the to-be-analyzed statement from the plurality of user intents according to mapping results on the plurality of user intents.

In one embodiment, the apparatus further includes a third determining unit, a fourth determining unit, and a fifth determining unit, where: the third determining unit determines a word vector of a first word segment, where the first word segment is one of the at least one word segment; the fourth determining unit determines a fused word vector of the first word segment according to the historical vector and the word vector of the first word segment; and the fifth determining unit determines an entity type of the first word segment according to the fused word vector of the first word segment.

In one embodiment, the fifth determining unit, when the to-be-analyzed statement includes a plurality of word segments, determines the entity type of the first word segment according to the fused word vector of the first word segment, a fused word vector of a second word segment, and a pre-learned entity type dependency relationship, where the second word segment is one of the plurality of word segments.

The apparatus for identifying a user intent of a statement in the embodiment of the disclosure has been described above from the perspective of the modular functional entity.

A device for identifying a user intent of a statement is further provided in the embodiments of the disclosure. The device for identifying a user intent of a statement in an embodiment of the disclosure is described below from the perspective of hardware.

Figure 11:
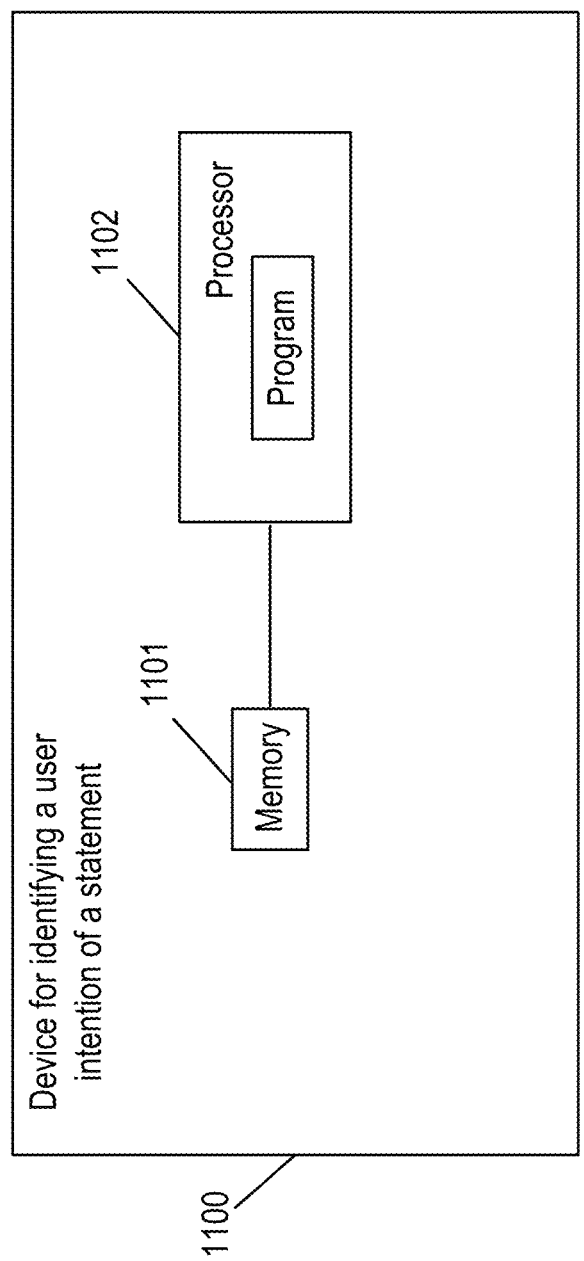
FIG. 11 is a block diagram of a device for identifying a user intent of a statement according to some embodiments of the disclosure.

FIG. 11 shows a device for identifying a user intent of a statement according to an embodiment of the disclosure. The device is applied in an HCI session, and the HCI session includes a plurality of statements. Referring to FIG. 11, the device 1100 includes a processor 1102 and a memory 1101, where: the memory 1101 stores program code and transmit the program code to the processor; and the processor 1102 performs the following method according to instructions in the program code: acquiring a to-be-analyzed statement and at least one historical statement corresponding to the to-be-analyzed statement from the plurality of statements, where the at least one historical statement is a statement appearing prior to the to-be-analyzed statement in the HCI session; determining a historical vector of the to-be-analyzed statement according to a statement vector of the to-be-analyzed statement and a statement vector of the at least one historical statement, where the historical vector includes information related to the to-be-analyzed statement in the at least one historical statement; and determining a user intent of the to-be-analyzed statement according to the historical vector.

In one embodiment, a plurality of to-be-analyzed statements exist, and the plurality of to-be-analyzed statements are the last plurality of statements in an interaction order among the plurality of statements.

In one embodiment, a statement interval between the at least one historical statement and the to-be-analyzed statement is less than a preset threshold.

In one embodiment, the processor 1102 performs the following method according to the instructions in the program code: determining a semantic similarity of a first historical statement for the to-be-analyzed statement and a semantic similarity of a second historical statement for the to-be-analyzed statement according to the statement vector of the to-be-analyzed statement, a statement vector of the first historical statement, and a statement vector of the second historical statement; determining an appearance positional relationship between the first historical statement and the to-be-analyzed statement as well as an appearance positional relationship between the second historical statement and the to-be-analyzed statement in the HCI session; determining the historical vector of the to-be-analyzed statement according to the semantic similarity of the first historical statement, the semantic similarity of the second historical statement, the appearance positional relationship of the first historical statement, and the appearance positional relationship of the second historical statement.

In one embodiment, the processor 1102 performs the following method according to the instructions in the program code: determining a fused vector of the to-be-analyzed statement according to the historical vector and the statement vector of the to-be-analyzed statement; and determining the user intent of the to-be-analyzed statement according to the fused vector.

In one embodiment, the processor 1102 performs the following method according to the instructions in the program code: weighted-summing the historical vector and the statement vector of the to-be-analyzed statement to acquire a fused vector of the to-be-analyzed statement.

In one embodiment, the processor 1102 performs the following method according to the instructions in the program code: mapping the fused vector to a plurality of preset user intents; and determining the user intent of the to-be-analyzed statement from the plurality of user intents according to mapping results on the plurality of user intents.

In one embodiment, the processor 1102 further performs the following method according to the instructions in the program code: determining a word vector of a first word segment, where the first word segment is one of the at least one word segment; determining a fused word vector of the first word segment according to the historical vector and the word vector of the first word segment; and determining an entity type of the first word segment according to the fused word vector of the first word segment.

In one embodiment, the processor 1102 further performs the following method according to the instructions in the program code: determining the entity type of the first word segment according to the fused word vector of the first word segment, a fused word vector of a second word segment, and a pre-learned entity type dependency relationship, where the second word segment is one of the plurality of word segments.

The above-mentioned embodiments may be implemented wholly or partially by software, hardware, firmware or any combination thereof. When implemented by software, the above-mentioned embodiments may be implemented wholly or partially in the form of computer program products.

The computer program products include one or a plurality of computer instructions. When the computer program instructions are loaded and executed on the computer, the processes or functions described in accordance with the embodiments of the present invention are generated wholly or partially. The computer may be a general-purpose computer, a special-purpose computer, a computer network, or any other programmable device. The computer instructions may be stored in a computer-readable storage medium or transmitted from one computer-readable storage medium to another computer-readable storage medium. For example, the computer instructions may be transmitted from a website site, computer, server or data center to another website site, computer, server or data center by a wired means (e.g., a coaxial cable, optical fiber or Digital Subscriber Line (DSL)) or a wireless means (e.g., infrared, radio or microwave). The computer-readable storage medium may be any available medium that the computer can access or a data storage device such as a server and a data center which contains one or a plurality of available media that are integrated. The available media may be magnetic media (e.g., a floppy disk, a hard disk, or a magnetic tape), optical media (e.g., a DVD), or semiconductor media (e.g., a Solid State Disk (SSD)), etc.

It should be noted that the embodiments in the present description are described in a progressive manner, and for identical or similar parts between different embodiments, reference may be made to each other so that each of the embodiments focuses on differences from other embodiments. In particular, the device and system embodiments are substantially similar to the method embodiments, and are thus described relatively concisely; and reference can be made to the description of the method embodiments for related parts. The device and system embodiments described above are merely illustrative, where the units described as separate components may or may not be physically separate, and the components displayed as units may or may not be physical units, that is, they may be located at the same place, or may be distributed to a plurality of network units. The objective of the solution of this embodiment may be implemented by selecting a part of or all the modules according to actual requirements. Those of ordinary skill in the art can understand and implement the disclosure without creative efforts.

The above description is only a specific implementation of the disclosure, and the protection scope of the disclosure is not limited thereto. Any technician skilled in the art can readily conceive of changes or replacements within the technical scope disclosed by the disclosure, and all the changes or replacements should fall within the protection scope of the disclosure. Thus, the protection scope of the disclosure should be subjected to the protection scope of the claims.

What is claimed is:

1. A method comprising:
acquiring a to-be-analyzed statement and at least one historical statement corresponding to the to-be-analyzed statement from a plurality of statements received during a communication session, the at least one historical statement appearing before the to-be-analyzed statement in the communication session;
computing a positional relationship between the to-be-analyzed statement and the at least one historical statement, the positional relationship representing a normalized distance between the to-be-analyzed statement and the at least one historical statement;
determining a historical vector of the to-be-analyzed statement based on a statement vector of the to-be-analyzed statement, a statement vector of the at least one historical statement, and the positional relationship, the historical vector comprising information related to the to-be-analyzed statement in the at least one historical statement; and
determining a user intent of the to-be-analyzed statement based on the historical vector.

2. The method of claim 1, the at least one historical statement comprising a plurality of historical statements, the plurality of historical statements comprising a first historical statement and a second historical statement, and the determining a historical vector of the to-be-analyzed statement based on a statement vector of the to-be-analyzed statement and a statement vector of the at least one historical statement comprises:
determining a first semantic similarity of the first historical statement to the to-be-analyzed statement and a second semantic similarity of the second historical statement to the to-be-analyzed statement based on the statement vector of the to-be-analyzed statement, a statement vector of the first historical statement, and a statement vector of the second historical statement;
determining a first appearance positional relationship between the first historical statement and the to-be-analyzed statement and a second appearance positional relationship between the second historical statement and the to-be-analyzed statement in the communication session; and
determining the historical vector of the to-be-analyzed statement based on the first semantic similarity, the second semantic similarity, the first appearance positional relationship, and the second appearance positional relationship.

3. The method of claim 1, the determining a user intent of the to-be-analyzed statement based on the historical vector comprising:
determining a fused vector of the to-be-analyzed statement based on the historical vector and the statement vector of the to-be-analyzed statement; and
determining the user intent of the to-be-analyzed statement based on the fused vector.

4. The method of claim 3, the determining a fused vector comprising weighted-summing the historical vector and the statement vector of the to-be-analyzed statement to obtain the fused vector of the to-be-analyzed statement.

5. The method of claim 3, the determining the user intent of the to-be-analyzed statement based on the fused vector comprising:
mapping the fused vector to a plurality of preset user intents; and
determining the user intent of the to-be-analyzed statement from the plurality of user intents based on mapping results on the plurality of user intents.

6. The method of claim 1, the to-be-analyzed statement comprising at least one word segment, and after determining the historical vector of the to-be-analyzed statement based on the statement vector of the to-be-analyzed statement and the statement vectors of the plurality of historical statements, the method further comprises:
determining a word vector of a first word segment, the first word segment comprising a word segment selected from the at least one word segment;
determining a fused word vector of the first word segment based on the historical vector and the word vector of the first word segment; and
determining an entity type of the first word segment based on the fused word vector of the first word segment.

7. The method of claim 6, the to-be-analyzed statement comprising a plurality of word segments and the determining an entity type of the first word segment based on the fused word vector of the first word segment comprising determining the entity type of the first word segment based on the fused word vector of the first word segment, a fused word vector of a second word segment, and a pre-learned entity type dependency relationship, wherein the second word segment is one of the plurality of word segments.

8. A non-transitory computer-readable storage medium for tangibly storing computer program instructions capable of being executed by a computer processor, the computer program instructions defining the steps of:
acquiring a to-be-analyzed statement and at least one historical statement corresponding to the to-be-analyzed statement from a plurality of statements received during a communication session, the at least one historical statement appearing before the to-be-analyzed statement in the communication session;
computing a positional relationship between the to-be-analyzed statement and the at least one historical statement, the positional relationship representing a normalized distance between the to-be-analyzed statement and the at least one historical statement;
determining a historical vector of the to-be-analyzed statement based on a statement vector of the to-be-analyzed statement, a statement vector of the at least one historical statement, and the positional relationship, the historical vector comprising information related to the to-be-analyzed statement in the at least one historical statement; and
determining a user intent of the to-be-analyzed statement based on the historical vector.

9. The computer-readable medium of claim 8, the at least one historical statement comprising a plurality of historical statements, the plurality of historical statements comprising a first historical statement and a second historical statement, and the determining a historical vector of the to-be-analyzed statement based on a statement vector of the to-be-analyzed statement and a statement vector of the at least one historical statement comprises:
determining a first semantic similarity of the first historical statement to the to-be-analyzed statement and a second semantic similarity of the second historical statement to the to-be-analyzed statement based on the statement vector of the to-be-analyzed statement, a statement vector of the first historical statement, and a statement vector of the second historical statement;

determining a first appearance positional relationship between the first historical statement and the to-be-analyzed statement and a second appearance positional relationship between the second historical statement and the to-be-analyzed statement in the communication session; and determining the historical vector of the to-be-analyzed statement based on the first semantic similarity, the second semantic similarity, the first appearance positional relationship, and the second appearance positional relationship.

10. The computer-readable medium of claim 8, the determining a user intent of the to-be-analyzed statement based on the historical vector comprising:

determining a fused vector of the to-be-analyzed statement based on the historical vector and the statement vector of the to-be-analyzed statement; and determining the user intent of the to-be-analyzed statement based on the fused vector.

11. The computer-readable medium of claim 10, the determining a fused vector comprising weighted-summing the historical vector and the statement vector of the to-be-analyzed statement to obtain the fused vector of the to-be-analyzed statement.

12. The computer-readable medium of claim 10, the determining the user intent of the to-be-analyzed statement based on the fused vector comprising:

mapping the fused vector to a plurality of preset user intents; and determining the user intent of the to-be-analyzed statement from the plurality of user intents based on mapping results on the plurality of user intents.

13. The computer-readable medium of claim 8, the to-be-analyzed statement comprising at least one word segment, and after determining the historical vector of the to-be-analyzed statement based on the statement vector of the to-be-analyzed statement and the statement vectors of the plurality of historical statements, the computer program instructions further defining the steps of:

determining a word vector of a first word segment, the first word segment comprising a word segment selected from the at least one word segment;

determining a fused word vector of the first word segment based on the historical vector and the word vector of the first word segment; and determining an entity type of the first word segment based on the fused word vector of the first word segment.

14. The computer-readable medium of claim 13, the to-be-analyzed statement comprising a plurality of word segments and the determining an entity type of the first word segment based on the fused word vector of the first word segment comprising determining the entity type of the first word segment based on the fused word vector of the first word segment, a fused word vector of a second word segment, and a pre-learned entity type dependency relationship, wherein the second word segment is one of the plurality of word segments.

15. An apparatus comprising:
a processor; and
a storage medium for tangibly storing thereon program logic for execution by the processor, the stored program logic comprising:

logic, executed by the processor, for acquiring a to-be-analyzed statement and at least one historical statement corresponding to a to-be-analyzed statement from the plurality of statements received during a communication session, the at least one historical statement appearing before the to-be-analyzed statement in the communication session;

logic, executed by the processor, for computing a positional relationship between the to-be-analyzed statement and the at least one historical statement, the positional relationship representing a normalized distance between the to-be-analyzed statement and the at least one historical statement;

logic, executed by the processor, for determining a historical vector of the to-be-analyzed statement based on a statement vector of the to-be-analyzed statement, a statement vector of the at least one historical statement, and the positional relationship t, the historical vector comprising information related to the to-be-analyzed statement in the at least one historical statement; and logic, executed by the processor, for determining a user intent of the to-be-analyzed statement based on the historical vector.

16. The apparatus of claim 15, the logic for determining a user intent of the to-be-analyzed statement based on the historical vector comprising:

logic, executed by the processor, for determining a fused vector of the to-be-analyzed statement based on the historical vector and the statement vector of the to-be-analyzed statement; and logic, executed by the processor, for determining the user intent of the to-be-analyzed statement based on the fused vector.

17. The apparatus of claim 16, the logic for determining a fused vector comprising logic, executed by the processor, for weighted-summing the historical vector and the statement vector of the to-be-analyzed statement to obtain the fused vector of the to-be-analyzed statement.

18. The apparatus of claim 16, the logic for determining the user intent of the to-be-analyzed statement based on the fused vector comprising:

logic, executed by the processor, for mapping the fused vector to a plurality of preset user intents; and logic, executed by the processor, for determining the user intent of the to-be-analyzed statement from the plurality of user intents based on mapping results on the plurality of user intents.

19. The apparatus of claim 15, the to-be-analyzed statement comprising at least one word segment, and after determining the historical vector of the to-be-analyzed statement based on the statement vector of the to-be-analyzed statement and the statement vectors of the plurality of historical statements, the logic further comprises:

logic, executed by the processor, for determining a word vector of a first word segment, the first word segment comprising a word segment selected from the at least one word segment;

logic, executed by the processor, for determining a fused word vector of the first word segment based on the historical vector and the word vector of the first word segment; and logic, executed by the processor, for determining an entity type of the first word segment based on the fused word vector of the first word segment.

20. The apparatus of claim 19, the to-be-analyzed statement comprising a plurality of word segments and the logic for determining an entity type of the first word segment based on the fused word vector of the first word segment comprising logic, executed by the processor, for determining the entity type of the first word segment based on the fused word vector of the first word segment, a fused word vector of a second word segment, and a pre-learned entity type dependency relationship, wherein the second word segment is one of the plurality of word segments.

* * * * *